United States Patent
Murata

(10) Patent No.: US 9,652,063 B2
(45) Date of Patent: May 16, 2017

(54) INPUT DIRECTION DETERMINATION SYSTEM, TERMINAL, SERVER, NETWORK SYSTEM, INFORMATION STORAGE MEDIUM, AND INPUT DIRECTION DETERMINATION METHOD

(71) Applicant: NAMCO BANDAI GAMES INC., Tokyo (JP)

(72) Inventor: Shigeto Murata, Mitaka (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 702 days.

(21) Appl. No.: 13/713,133

(22) Filed: Dec. 13, 2012

(65) Prior Publication Data

US 2013/0154974 A1 Jun. 20, 2013

(30) Foreign Application Priority Data

Dec. 16, 2011 (JP) ................................ 2011-276512

(51) Int. Cl.
    G06F 3/041 (2006.01)
    G06F 3/0488 (2013.01)
    A63F 13/426 (2014.01)
    A63F 13/2145 (2014.01)
    A63F 13/92 (2014.01)

(52) U.S. Cl.
    CPC ........ *G06F 3/0412* (2013.01); *A63F 13/2145* (2014.09); *A63F 13/426* (2014.09); *A63F 13/92* (2014.09); *G06F 3/0488* (2013.01)

(58) Field of Classification Search
    CPC . G06F 3/04883; G06F 2203/041–2203/04113; A63F 13/42; A63F 13/214

USPC ............... 345/173–178; 178/18.01–18.11; 715/700–702
    See application file for complete search history.

(56) References Cited

U.S. PATENT DOCUMENTS

| 8,172,681 B2 | 5/2012 | Kando et al. |
| 2006/0052166 A1* | 3/2006 | Ohta ................ A63F 13/02 463/36 |
| 2006/0109259 A1* | 5/2006 | Ohta ................ G06F 3/0485 345/173 |

(Continued)

FOREIGN PATENT DOCUMENTS

| JP | B-3734820 | 1/2006 |
| JP | 2006-304855 A | 11/2006 |

(Continued)

*Primary Examiner* — Amare Mengistu
*Assistant Examiner* — Stacy Khoo
(74) *Attorney, Agent, or Firm* — Posz Law Group, PLC

(57) ABSTRACT

An input direction determination system includes an input direction determination section that determines the input direction based on a reference point and the indication position, and a reference point change section that determines whether or not to change the reference point based on an angle formed by a first direction that is determined by the reference point and an indication position at a first timing or a timing that precedes the first timing, and a second direction that is determined by the indication position at the first timing and an indication position at a second timing that follows the first timing, or an angle formed by connection lines that connect indication positions at different timings, and changes the reference point.

18 Claims, 25 Drawing Sheets

(56) References Cited

U.S. PATENT DOCUMENTS

2012/0212429 A1* 8/2012 Okura ................ G06F 3/04883
345/173

FOREIGN PATENT DOCUMENTS

JP 2011-103044 A 5/2011
JP WO 2011058783 A1 * 5/2011 ......... G06F 3/04883

* cited by examiner

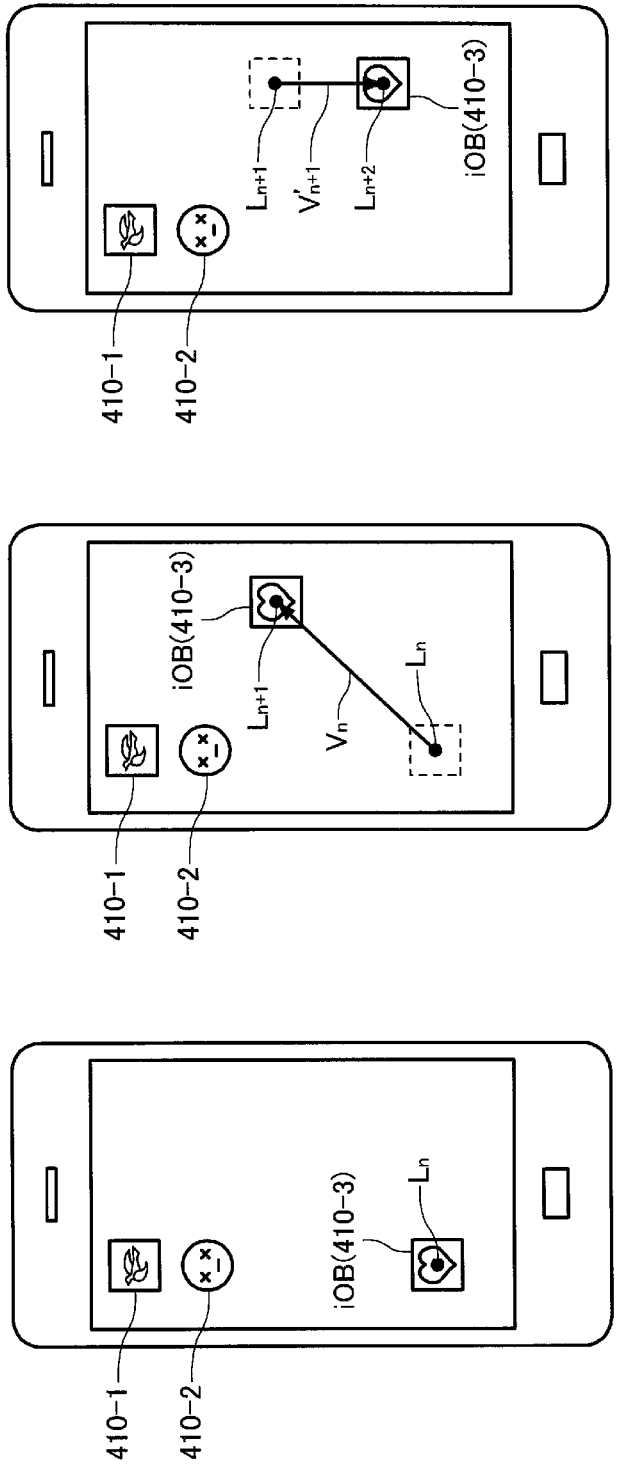

INPUT DIRECTION DETERMINATION SYSTEM, TERMINAL, SERVER, NETWORK SYSTEM, INFORMATION STORAGE MEDIUM, AND INPUT DIRECTION DETERMINATION METHOD

Japanese Patent Application No. 2011-276512, filed on Dec. 16, 2011, is hereby incorporated by reference in its entirety.

BACKGROUND OF THE INVENTION

The present invention relates to an input direction determination system, a terminal, a server, a network system, an information storage medium, and an input direction determination method.

A game has been known that utilizes a joystick as a controller, and allows the player to perform a direction input by tilting the joystick in the forward, backward, rightward, or leftward direction. In such a game, the joystick tilt direction and the joystick tilt amount are respectively processed as the input direction and the input amount. When the player has tilted the joystick in one direction by some amount, and holds the joystick at the tilted position, position information about the joystick is continuously output, and processed as the input direction and the input amount.

In recent years, a game that implements a joystick-like operation using a game device that includes a touch panel has been developed. In this case, an X-axis vector value and a Y-axis vector value that correspond to the joystick input values are obtained from the touch position on the touch panel. The direction of the vector value corresponds to the joystick tilt direction, and the magnitude of the vector value corresponds to the joystick tilt amount.

Japanese Patent No. 3734820 discloses an invention that sets a reference point based on a touch position on a touch panel that has not been touched, and maintains the reference point when the touch panel is continuously touched.

However, when the reference point is fixed during a period in which the touch panel is touched, the player may feel inconsistency with the actual input operation.

SUMMARY

The invention may provide an input direction determination system, a terminal, a server, a network system, an information storage medium, and an input direction determination method that can change a reference point corresponding to a change in moving direction of an indication position, and implement an input direction determination process that matches the operation feel of the player.

According to a first aspect of the invention, there is provided an input direction determination system that determines an input direction based on an indication position, the input direction determination system including:

an input direction determination section that determines the input direction based on a reference point and the indication position; and a reference point change section that determines whether or not to change the reference point based on an angle formed by a first direction that is determined by the reference point and an indication position at a first timing or a timing that precedes the first timing, and a second direction that is determined by the indication position at the first timing and an indication position at a second timing that follows the first timing, or an angle formed by connection lines that connect indication positions at different timings, and changes the reference point According to a second aspect of the invention, there is provided a terminal that functions as the above input direction determination system.

According to a third aspect of the invention, there is provided a server that functions as the above input direction determination system, and determines the input direction based on an indication position on a terminal, the server including:

a communication control section that receives information about the indication position from the terminal via a network.

According to a fourth aspect of the invention, there is provided a network system that includes a terminal and a server that are connected via a network, and functions as the above input direction determination system, the network system including:

an acquisition section that acquires information about an indication position on the terminal.

According to a fifth aspect of the invention, there is provided a non-transitory information storage medium storing a program that implements a process that determines an input direction based on an indication position, the program causing a computer to function as:

an input direction determination section that determines the input direction based on a reference point and the indication position; and a reference point change section that determines whether or not to change the reference point based on an angle formed by a first direction that is determined by the reference point and an indication position at a first timing or a timing that precedes the first timing, and a second direction that is determined by the indication position at the first timing and an indication position at a second timing that follows the first timing, or an angle formed by connection lines that connect indication positions at different timings, and changes the reference point.

According to a sixth aspect of the invention, there is provided an input direction determination method that determines an input direction based on an indication position, the input direction determination method including:

determining the input direction based on a reference point and the indication position; and determining whether or not to change the reference point based on an angle formed by a first direction that is determined by the reference point and an indication position at a first timing or a timing that precedes the first timing, and a second direction that is determined by the indication position at the first timing and an indication position at a second timing that follows the first timing, or an angle formed by connection lines that connect indication positions at different timings, and changing the reference point.

BRIEF DESCRIPTION OF THE SEVERAL VIEWS OF THE DRAWING

FIGS. 25A to 25C illustrate an example of a movement control process according to one embodiment of the invention.

Figure 1:
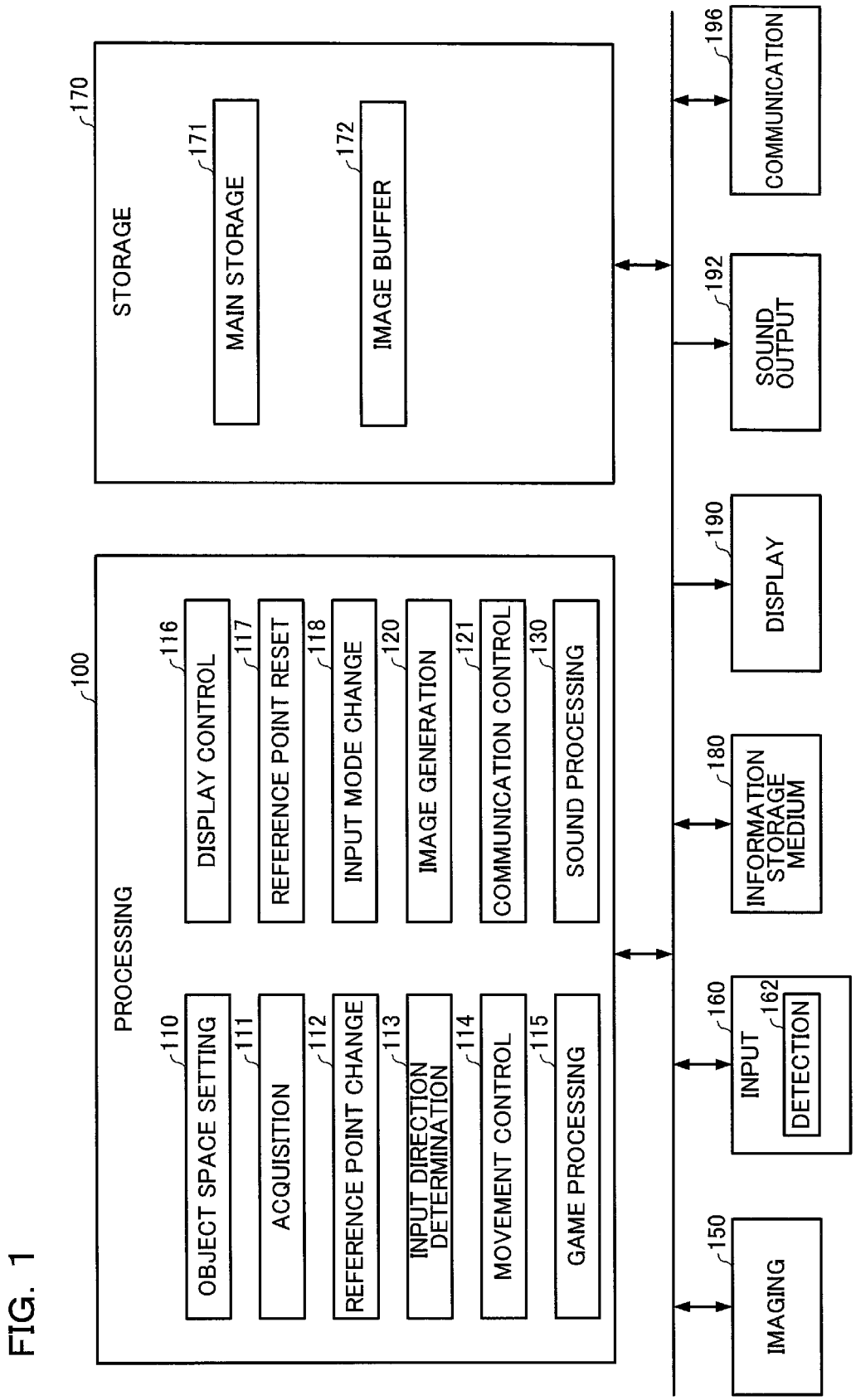
FIG. 1 is a functional block diagram illustrating a terminal according to one embodiment of the invention.

DETAILED DESCRIPTION OF THE EMBODIMENT (1) One embodiment of the invention relates to an input direction determination system that determines an input direction based on an indication position, the input direction determination system including:

an input direction determination section that determines the input direction based on a reference point and the indication position; and a reference point change section that determines whether or not to change the reference point based on an angle formed by a first direction that is determined by the reference point and an indication position at a first timing or a timing that precedes the first timing, and a second direction that is determined by the indication position at the first timing and an indication position at a second timing that follows the first timing, or an angle formed by connection lines that connect indication positions at different timings, and changes the reference point.

Another embodiment of the invention relates to a terminal that functions as the above input direction determination system.

Another embodiment of the invention relates to a server that functions as the above input direction determination system, and determines the input direction based on an indication position on a terminal, the server including:

a communication control section that receives information about the indication position from the terminal via a network.

Another embodiment of the invention relates to a network system that includes a terminal and a server that are connected via a network, and functions as the above input direction determination system, the network system including:

an acquisition section that acquires information about an indication position on the terminal.

Another embodiment of the invention relates to a non-transitory information storage medium storing a program that implements a process that determines an input direction based on an indication position, the program causing a computer to function as:

an input direction determination section that determines the input direction based on a reference point and the indication position; and a reference point change section that determines whether or not to change the reference point based on an angle formed by a first direction that is determined by the reference point and an indication position at a first timing or a timing that precedes the first timing, and a second direction that is determined by the indication position at the first timing and an indication position at a second timing that follows the first timing, or an angle formed by connection lines that connect indication positions at different timings, and changes the reference point.

Another embodiment of the invention relates to an input direction determination method that determines an input direction based on an indication position, the input direction determination method including:

determining the input direction based on a reference point and the indication position; and determining whether or not to change the reference point based on an angle formed by a first direction that is determined by the reference point and an indication position at a first timing or a timing that precedes the first timing, and a second direction that is determined by the indication position at the first timing and an indication position at a second timing that follows the first timing, or an angle formed by connection lines that connect indication positions at different timings, and changing the reference point.

The indication position may be indicated by two-dimensional coordinates, and may be indicated by three-dimensional coordinates. For example, a touch position (two-dimensional coordinates) on a touch panel or the like may be acquired as the indication position. When it is possible to detect a change in spatial position of a pointer, a spatial position (three-dimensional coordinates) may be acquired as the indication position.

The reference point may be determination based on an input operation, or may be set to a predetermined position. For example, a point at which the player has touched a touch panel or the like that has not been touched may be set as the reference point. Alternatively, a predetermined position of a display section may be set as the reference point.

The first direction may be the direction of a line segment that connects the reference point and the indication position at the first timing or a timing that precedes the first timing. The second direction may be the direction of a line segment that connects the indication position at the first timing or a timing that precedes the first timing and the indication position at the second timing that follows the first timing.

The reference point change section may determine whether or not a reference point change condition is satisfied based on a first direction that is the input direction acquired in the preceding frame or the input direction acquired in a fame prior to the current frame by a predetermined frame, and a second direction that connects the indication position acquired in the preceding frame or the indication position acquired in a fame prior to the current frame by a predetermined frame and the current indication position, and may change the reference point when the reference point change section has determined that the reference point change condition is satisfied.

According to the above configuration, since the reference point can be changed corresponding to a change in moving direction of the indication position, it is possible to implement an input direction determination process that matches the operation feel of the player. Moreover, the reference point can be changed based on a change in indication position even when a touch panel is being touched.

(2) Each of the input direction determination system, the terminal, the server, the network system, the information storage medium, and the input direction determination method may further include a movement control section that performs a movement control process based on the input direction.

The target of the movement control process may be an object on a two-dimensional plane, or may be an object in a three-dimensional space. The target of the movement control process may be a display object, or may be a non-display object (e.g., the virtual camera or a first-person viewpoint player object).

According to the above configuration, since the reference point can be changed corresponding to a change in moving direction of the indication position, it is possible to implement a movement control process that matches the operation feel of the player.

(3) In each of the input direction determination system, the terminal, the server, the network system, the information storage medium, and the input direction determination method, the reference point change section may determine a new position of the reference point based on a previous indication position.

When changing the reference point based on the angle formed by the first direction that is determined by the reference point and the indication position at a first timing or a timing that precedes the first timing, and the second direction that is determined by the indication position at the first timing and an indication position at the second timing that follows the first timing, the position of the reference point may be determined based on the indication position at the first timing.

(4) Each of the input direction determination system, the terminal, the server, the network system, the information storage medium, and the input direction determination method may further include a display control section that performs a display control process on an object, and the movement control section may perform the movement control process on a display object based on the input direction.

The target of the display control process may be a two-dimensional object (e.g., an object of a two-dimensional game, or an icon displayed on the display section), or may be a three-dimensional object (e.g., object in a three-dimensional space).

For example, the input direction determination system and the like may further include an image generation means that generates an image of an object space viewed from a virtual camera, and the movement control section may perform the movement control process on an object in the object space based on the input direction, and the display control section may perform a control process that displays the image of the object space viewed from the virtual camera on a display section, and causes the virtual camera to follow the object.

(5) Each of the input direction determination system, the terminal, the server, the network system, the information storage medium, and the input direction determination method may acquire information about a touch position on a display section as the indication position.

The display section may include a member (e.g., touch panel) that can detect a touch position.

(6) Each of the input direction determination system, the terminal, the server, the network system, the information storage medium, and the input direction determination method may further include a reference point reset section that resets the reference point based on predetermined input information.

The predetermined input information may be input information that indicates that a predetermined button of an operation section has been pressed, or input information that indicates that the detection result for acceleration or angular acceleration applied to the device indicates a predetermined state.

(7) In each of the input direction determination system, the terminal, the server, the network system, the information storage medium, and the input direction determination method, the reference point reset section may set an area that corresponds to a predetermined area of a display section as a reset area, may determine whether or not the reset area has been touched based on information about a touch position on the display section, and may reset the reference point when the reference point reset section has determined that the reset area has been touched.

When the reference point has been reset, the next touch position may be set as the reference point. When the reference point has been reset, a reference point reset message may be output to prompt the player to set a new reference point.

(8) Each of the input direction determination system, the terminal, the server, the network system, the information storage medium, and the input direction determination method may further include an input mode change section that changes a current input mode based on predetermined input information, and the input direction determination section may calculate the input direction from the reference point and the indication position as the input information when the current input mode is a first input mode.

The predetermined input information may be input information that indicates that a predetermined button has been pressed, or input information that indicates that the detection result for acceleration or angular acceleration applied to the device indicates a predetermined state.

(9) In each of the input direction determination system, the terminal, the server, the network system, the information storage medium, and the input direction determination method, the movement control section may change a movement control target object based on information about a touch position, and may perform the movement control process on a new movement control target object based on the input direction.

(10) In each of the input direction determination system, the terminal, the server, the network system, the information storage medium, and the input direction determination method, the reference point change section may determine the first direction based on a touch position at the first timing or touch positions at a plurality of timings that precede the first timing.

The first direction may be determined based on a plurality of input directions determined by touch positions at a plurality of timings that precede the first timing. For example, a direction obtained by weighted-averaging a plurality of input directions in a predetermined ratio may be set as the first direction. This makes it possible to implement an input direction determination that more accurately reflects the movement of the touch position.

(11) In each of the input direction determination system, the terminal, the server, the network system, the information storage medium, and the input direction determination method, the reference point change section may determine the second direction based on touch positions at three or more timings that precede the second timing.

The second direction may be determined based on the directions of a plurality of line segments that connect touch positions at three or more timings that precede the second timing. For example, a direction obtained by weighted-averaging the directions of a plurality of line segments in a predetermined ratio may be set as the second direction. This makes it possible to implement an input direction determination that more accurately reflects the movement of the touch position.

Exemplary embodiments of the invention are described below. Note that the following exemplary embodiments do not unduly limit the scope of the invention as stated in the claims. Note also that all of the elements described below should not necessarily be taken as essential elements of the invention.

1. Configuration

The configuration of a terminal 10 according to one embodiment of the invention is described below with reference to FIG. 1. The terminal 10 may be a mobile phone, a smartphone, a portable terminal, a game device, a portable game device, an image generation device, or the like. FIG. 1 is a functional block diagram illustrating the terminal 10. Note that the terminal may have a configuration in which some of the elements (sections) illustrated in FIG. 1 are omitted.

An imaging section 150 captures an object. The function of the imaging section 150 may be implemented by an image sensor (e.g., CCD or CMOS sensor) and an optical system (e.g., lens).

An input section 160 allows the player to input operation data. The function of the input section 160 may be implemented by a touch panel, a touch panel display, a mouse, a trackball, or the like. The input section 160 includes a detection section 162 that can detect two-dimensional indication position coordinates (x, y). For example, the detection section 162 can detect two-dimensional touch position coordinates (x, y) in a touch detection area (touch panel).

The touch position (i.e., touch position coordinates or indication position) is position information obtained from the touch detection area due to a touch operation performed by the player. When a plurality of touch positions have been simultaneously detected in the touch detection area, one of the plurality of touch positions (e.g., the touch position that has been detected first) may be used.

Figure 2A:
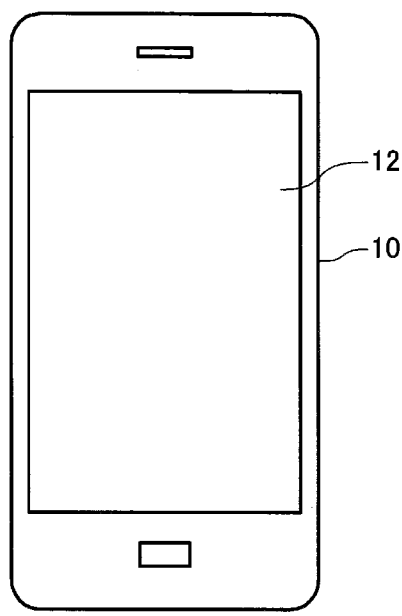
FIGS. 2A and 2B illustrate an example of a terminal according to one embodiment of the invention.
Figure 2B:
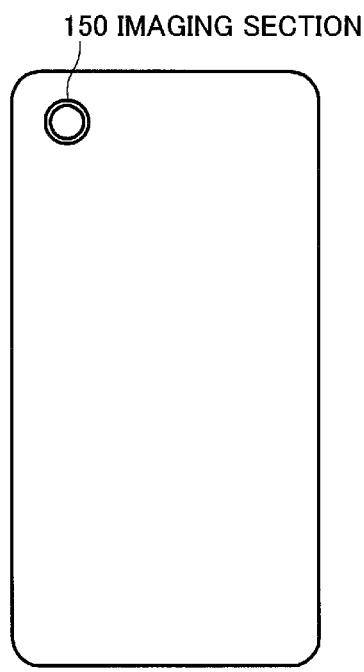
Figure 3:
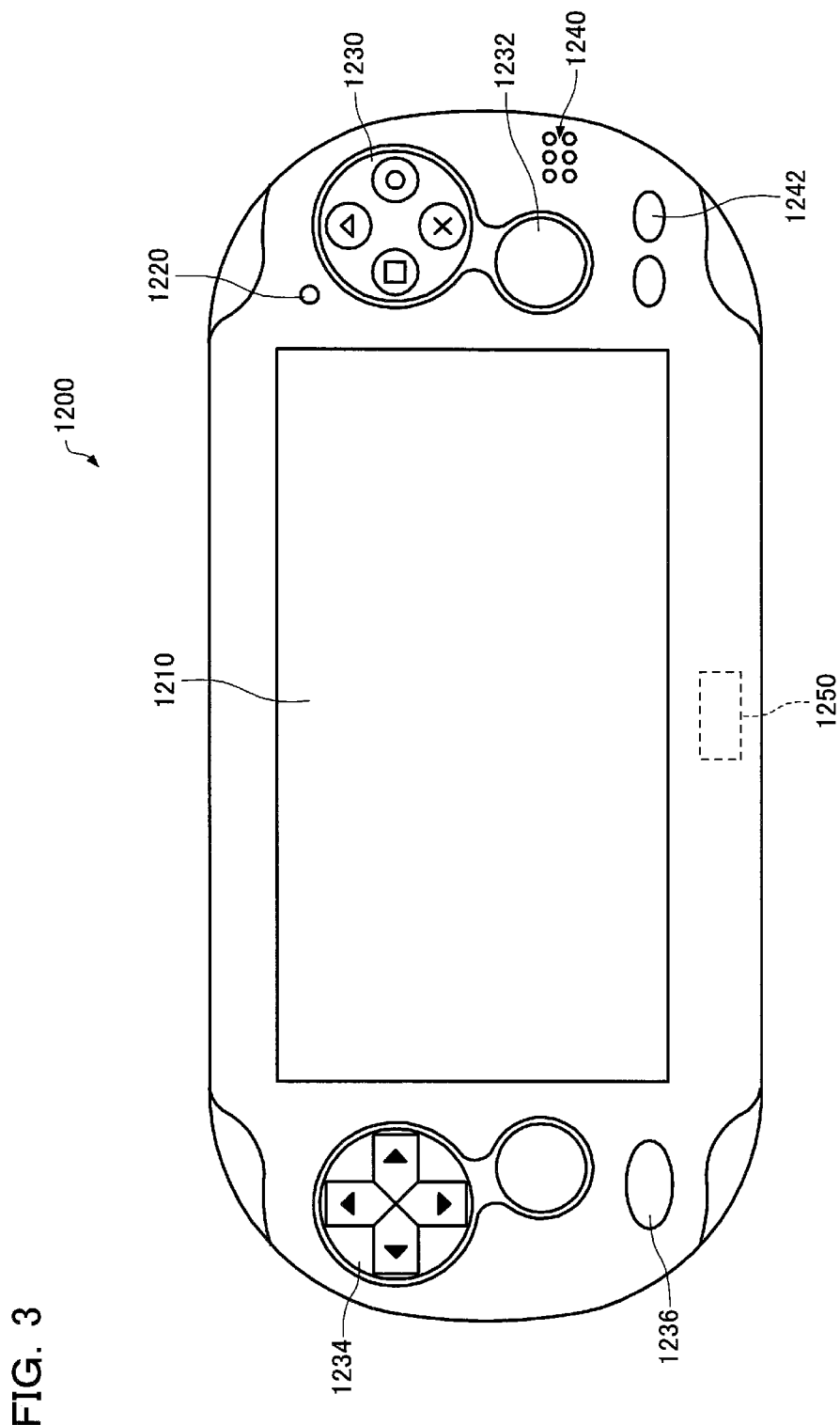
FIG. 3 illustrates an example of a terminal according to one embodiment of the invention.

In this embodiment, a display screen (display) 12 illustrated in FIGS. 2A and 2B and a display screen 1210 illustrated in FIG. 3 are implemented by a touch panel display in which a liquid crystal display and a touch panel for detecting the touch position of the player (operator or user) are stacked. Therefore, the display screen functions as the input section 160 and a display section 190. A touch operation on the display screen 12 may be performed with a fingertip, or may be performed using an input device (e.g., touch pen). The input section 160 may be configured so that the player changes the operation direction (rotation direction) of an operation element (ball) of an operation section.

The input section 160 may include a button, a lever, a keyboard, a steering wheel, a microphone, an acceleration sensor, or the like that allows the player to input operation information (operation signal) other than the indication position.

A storage section 170 serves as a work area for a processing section 100, a communication section 196, and the like. The function of the storage section 170 may be implemented by a RAM (VRAM) or the like. The storage section 170 includes a main storage section 171 that is used as a work area, and an image buffer 172 that stores the final display image and the like. Note that the main storage section 171 or the image buffer 172 may be omitted.

The storage section 170 is configured so that a touch position acquired by an acquisition section 111, the coordinates of a reference point, and the like are stored in the main storage section 171.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like. The processing section 100 performs various processes in this embodiment based on a program (data) stored in the information storage medium 180. A program that causes a computer to function as each section in this embodiment (i.e., a program that causes a computer to execute the process of each section) may be stored in the information storage medium 180.

The display section 190 outputs an image generated in this embodiment. The function of the display section 190 may be implemented by a CRT, an LCD, a touch panel display, a head mount display (HMD), or the like. The display 12 that utilizes a touch panel display functions as the display section 190, and also functions as the input section 160 that allows the player to perform a game operation. A resistive (four-wire or five-wire) touch panel, a capacitive touch panel, an electromagnetic induction touch panel, an ultrasonic surface acoustic wave touch panel, an infrared scan touch panel, or the like may be used as the touch panel.

A sound output section 192 outputs sound generated in this embodiment. The function of the sound output section 192 may be implemented by a speaker, a headphone, or the like.

The communication section 196 performs various types of control for communicating with the outside (e.g. host device or another terminal). The function of the communication section 196 may be implemented by hardware such as a processor or a communication ASIC, a program, or the like.

Note that the terminal 10 may receive a program (data) that causes a computer to function as each section in this embodiment from an information storage medium or a storage section included in a server via a network, and may store the received program (data) in the information storage medium 180 or the storage section 170. A case where the terminal 10 receives a program (data) that causes the terminal 10 to function as each section is included within the scope of the invention.

The processing section 100 (processor) performs a game process, an image generation process, a sound generation process, and the like based on data input from the input section 160, a program, and the like. The game process includes a process that starts the game when game start conditions have been satisfied, a process that proceeds with the game, a process that disposes an object such as a player object or an enemy object, a process that displays the object, a process that calculates game results, a process that terminates the game when game end conditions have been satisfied, and the like. The processing section 100 performs various processes using the storage section 170 as a work area. The function of the processing section 100 may be implemented by hardware such as a processor (e.g., CPU or DSP) or an ASIC (e.g., gate array), or a program.

The processing section 100 includes an object space setting section 110, the acquisition section 111, a reference point change section 112, an input direction determination section 113, a movement control section 114, a game processing section 115, a display control section 116, an image generation section 120, a communication control section 121, and a sound processing section 130. Note that the processing section 100 may have a configuration in which some of these sections are omitted.

The object space setting section 110 disposes (sets) an object (i.e., an object formed by a primitive surface such as a sprite, a billboard, a polygon, a free-form surface, or a subdivision surface) that represents a display object (e.g., object (player object, moving object, or enemy object), moving path, building, tree, pillar, wall, or map (topography)) in an object space. More specifically, the object space setting section 110 determines the position and the rotation angle (synonymous with orientation or direction) of an object (model object), and disposes the object at the determined position (X, Y) or (X, Y, Z) and the determined rotation angle (rotation angles around X-axis and Y-axis) or (rotation angles around X-axis, Y-axis, and Z-axis).

The term "object space" used herein includes a virtual two-dimensional space and a virtual three-dimensional space. The two-dimensional space is a space in which the object is disposed at two-dimensional coordinates (X, Y), and the three-dimensional space is a space in which the object is disposed at three-dimensional coordinates (X, Y, Z), for example.

When the object space is a two-dimensional space, the object space setting section 110 disposes each object based on the priority set to each object. For example, the object space setting section 110 may dispose each object in order from an object (sprite) that is disposed on the deep side, and may dispose an object that is disposed on the front side over the object that has been disposed.

It is possible to generate an image in which an object space that corresponds to the upper side of the screen is disposed on the deep side, and an object space that corresponds to the lower side of the screen is disposed on the front side by disposing an object having a large drawing size on the lower side of the image, and disposing an object having a small drawing size on the upper side of the image.

When the object space is a three-dimensional space, the object space setting section 110 disposes the object in a world coordinate system to generate a deep image that is viewed from a given viewpoint. In this case, the image generation section 120 controls a virtual camera (viewpoint) for generating an image viewed from a given (arbitrary) viewpoint in the object space. More specifically, the image generation section 120 performs a process that controls the position (X, Y, Z) or the rotation angle (rotation angles around X-axis, Y-axis, and Z-axis) of the virtual camera (i.e., a process that controls the viewpoint position or the line-of-sight direction).

For example, when photographing an object (e.g. character, ball, or car) from behind using the virtual camera, the image generation section 120 controls the position or the rotation angle (orientation) of the virtual camera so that the virtual camera follows a change in position or rotation of the object. In this case, the image generation section 120 may control the virtual camera based on information about the position, the rotation angle, the speed, and the like of the object obtained by the movement control section 114. Alternatively, the image generation section 120 may rotate the virtual camera by a predetermined rotation angle, or may move the virtual camera along a predetermined moving path. In this case, the image generation section 120 controls the virtual camera based on virtual camera data that specifies the position (moving path) or the rotation angle of the virtual camera. When a plurality of virtual cameras (viewpoints) are provided, the image generation section 120 performs the above control process on each virtual camera.

The acquisition section 111 performs a recognition process on input information that has been input by the player using the input section 160. More specifically, the acquisition section 111 acquires an indication position that has been input using the input section 160.

For example, the acquisition section 111 acquires a touch position (two-dimensional touch position coordinates) within the touch detection area (touch panel) that detects a touch operation performed by the player as the indication position. More specifically, the acquisition section 111 acquires a touch position within a touch operation period (slide operation period) that corresponds to a period in which the player touches the touch panel with a finger, moves the finger, and then removes the finger from the touch panel.

The input information may be two-dimensional position coordinates indicated using a mouse or the like. In this case, the acquisition section 111 may acquire position coordinates indicated using a mouse within a period in which the player presses the button of the mouse, moves (drags) the mouse while pressing the button, and then releases the button.

The acquisition section 111 acquires an indication position that is input in a predetermined cycle. The predetermined cycle may be 1/60th of a second, 1/30th of a second, or 1/10th of a second, for example. When the predetermined cycle is 1/30th of a second, the acquisition section 111 acquires an indication position every 1/30th of a second. The acquisition section 111 may acquire an indication position in a cycle that is equal to the drawing frame rate.

The input direction determination section 113 determines the input direction based on a reference point and the indication position. The reference point change section 112 determines whether or not to change the reference point based on the angle formed by a first direction that is determined by the reference point and an indication position at a first timing or a timing that precedes the first timing, and a second direction that is determined by the indication position at the first timing and an indication position at a second timing that follows the first timing, or the angle formed by connection lines that connect indication positions at different timings, and changes the reference point when the reference point change section 112 has determined to change the reference point.

The movement control section 114 performs a movement control process based on the input direction.

The reference point change section 112 may determine the new position of the reference point based on the previous indication position.

The display control section 116 may perform a display control process on the object, and the movement control section 114 may perform the movement control process on the display object based on the input direction.

The acquisition section 111 may acquire information about the touch position on the display section as the indication position.

A reference point reset section 117 may reset the reference point based on predetermined input information.

The reference point reset section 117 may set an area that corresponds to a predetermined area of the display section as a reset area, may determine whether or not the reset area has been touched based on the information about the touch position on the display section, and may reset the reference point when the reference point reset section 117 has determined that the reset area has been touched.

An input mode change section 118 may change the current input mode based on predetermined input information, and the input direction determination section 113 may calculate the input direction from the reference point and the indication position as the input information when the current input mode is a first input mode.

The movement control section 114 may change the movement control target object based on the information about the touch position, and may perform the movement control process on the new movement control target object based on the input direction. The movement control section 114 performs a movement calculation process on the object (e.g., character object or moving object). More specifically, the movement control section 114 moves the moving object in the object space, or controls the motion (animation) of the moving object based on the input data input by the player using the input section 160, a program (movement algorithm), data (motion data), and the like.

More specifically, the movement control section 114 performs a simulation process that sequentially calculates movement information (moving direction, moving amount, moving speed, position, rotation angle, or acceleration) and motion information (position or rotation angle of each part object) about the object every frame (e.g., 1/60th of a second). The term "frame" used herein refers to a time unit used when performing the object movement/motion process (simulation process) or the image generation process. The frame rate may be fixed, or may be changed corresponding to the processing load.

The movement control section 114 moves the object based on the input direction determined by the input direction determination section 113. More specifically, the movement control section 114 moves the object in a moving direction that corresponds to the input direction determined by the input direction determination section 113. For example, when the input direction is a rightward direction, the movement control section 114 moves the object in the rightward direction (positive x-axis direction) of the screen. When the input direction is a downward direction, the movement control section 114 moves the object in the downward direction (negative y-axis direction) of the screen. When the input direction is a leftward direction, the movement control section 114 moves the object in the leftward direction (negative x-axis direction) of the screen. When the input direction is an upward direction, the movement control section 114 moves the object in the upward direction (positive y-axis direction) of the screen.

The movement control section 114 may move the object in a three-dimensional object space based on the input direction. For example, a moving direction may be linked to each input direction in advance, and the movement control section 114 may move the object in the moving direction that corresponds to the input direction.

The game processing section 115 performs a game calculation process.

The display control section 116 performs a process that displays a game image that includes the player object, the enemy object, and the like.

The communication control section 121 may perform a process that allows the terminal (e.g., first terminal) to exchange data with another terminal (e.g., second terminal) or the server 20 via a network.

The terminal 10 may acquire network information necessary for a communication control process from a server, and manages the network information, for example. For example, the terminal 10 may acquire and manage terminal identification information (ID) (i.e., data assigned to each terminal in order to identify a terminal that can participate in the online game) that is assigned to each terminal, and packet destination information (e.g., IP address) that is linked to the terminal identification information.

The communication control section 121 performs a process that generates a packet that is transmitted to another terminal (second terminal) or the server 20, a process that designates the IP address or the port number of the packet transmission destination terminal, a process that stores data included in the received packet in the storage section 170, a process that analyzes the received packet, a process that controls an additional packet transmission/reception process, and the like.

The communication control section 121 also performs a process that transmits and receives data in a predetermined cycle (e.g., every second) after the terminal 10 has connected to another terminal or the server 20 (i.e., after connection between a first terminal and a second terminal has been established) until the terminal 10 disconnects from the other terminal or the server 20. The data exchanged between the terminals may be the input information input using the input section, or may be position information or movement information about the object (character or moving object) that is operated using each terminal.

The communication control section 121 also performs a process that analyzes a packet transmitted from another terminal (second terminal) or the server 20, and stores data (e.g., position information about the object that is operated using the other terminal) included in the received packet in the storage section.

When the network system includes a plurality of terminals, a peer-to-peer (P2P) system may be used so that the plurality of terminals execute the online game while exchanging data, or a client-server system may be used so that the plurality of terminals execute the online game while exchanging data (information) via the server 20. The network system in this embodiment may utilize wireless data communication instead of cable data communication.

The communication control section 121 may perform a process that transmits the input information (acceleration) from the input section of the terminal 10 to the server 20.

The communication control section 121 may receive various images that are displayed on the display section 190 of the game terminal 10.

The image generation section 120 performs a drawing process based on the results for various processes (game process) performed by the processing section 100 to generate an image, and outputs the generated image to the display section (display) 190. The image generation section 120 may generate a two-dimensional image, or may generate a three-dimensional image.

When the image generation section 120 generates a two-dimensional image, the image generation section 120 draws each object in order from an object with the lowest priority, and draws an object with a higher priority over the drawn object when an overlap occurs.

When the image generation section 120 generates a three-dimensional game image, the image generation section 120 receives object data (model data) including vertex data (e.g., vertex position coordinates, texture coordinates, color data, normal vector, or α-value) of each vertex of the object (model), and performs a vertex process based on the vertex data included in the received object data. Note that the image generation section 120 may optionally perform a vertex generation process (tessellation, curved surface division, or polygon division) for subdividing the polygon when performing the vertex process.

When the image generation section 120 performs the vertex process, the image generation section 120 performs a vertex movement process and a geometric process such as coordinate transformation (world coordinate transformation or camera coordinate transformation), clipping, perspective transformation, or a light source process, and changes (updates or adjusts) the vertex data of each vertex of the object based on the processing results. The image generation section 120 performs a rasterization process (scan conversion) based on the vertex data subjected to the vertex process, so that the surface of the polygon (primitive) is linked to pixels. The image generation section 120 then performs a pixel process (fragment process) that draws the pixels that form the image (fragments that form the display screen).

When the image generation section 120 performs the pixel process, the image generation section 120 determines the final drawing color of each pixel by performing a texture reading (texture mapping) process, a color data setting/change process, a translucent blending process, an anti-aliasing process, and the like, and outputs (draws) the drawing color of the object subjected to perspective transformation to the image buffer 172 (i.e., a frame buffer, a buffer that can store image information on a pixel basis, a VRAM, or a rendering target). The pixel process includes a per-pixel process that sets or changes the image information (e.g., color, normal, luminance, and α-value) on a pixel basis.

The image generation section 120 thus generates an image viewed from the virtual camera (given viewpoint) set in the object space. When a plurality of virtual cameras (viewpoints) are provided, the image generation section 120 may generate an image so that images (segmented images) viewed from the respective virtual cameras are displayed on one screen.

The vertex process and the pixel process performed by the image generation section 120 may be implemented by hardware that enables a programmable polygon (primitive) drawing process (i.e. programmable shader (vertex shader or pixel shader)) according to a shader program written in shading language. The programmable shader enables a programmable per-vertex process and a programmable per-pixel process to increase the degree of freedom of the drawing process, so that the representation capability can be significantly improved as compared with a fixed hardware drawing process.

The image generation section 120 performs a geometric process, a texture mapping process, a hidden surface removal process, an α-blending process, and the like when drawing the object.

The geometric process includes subjecting the object to coordinate transformation, clipping, perspective projection transformation, light source calculations, and the like. The image generation section 120 stores the object data (e.g., object vertex position coordinates, texture coordinates, color data (luminance data), normal vector, or α value) subjected to the geometric process (subjected to perspective transformation) in the storage section 170.

The texture mapping process includes mapping a texture (texel value) stored in a texture storage section included in the storage section 170 onto the object. More specifically, a texture (surface properties such as color (RGB) and α-value) (two-dimensional image) is read from the texture storage section included in the storage section 170 using the texture coordinates that are set (assigned) to each vertex of the object, and mapped onto the object. In this case, the image generation section 120 performs a pixel-texel link process, a bilinear interpolation process (texel interpolation process), and the like.

The image generation section 120 may map a given texture when drawing the object. This makes it possible to dynamically change the color distribution (texel pattern) of the texture mapped onto the object.

In this case, a texture that has a different color distribution (pixel pattern) may be dynamically generated, or a plurality of textures that differ in color distribution may be provided in advance, and dynamically selected. The color distribution of the texture may be changed corresponding to each object.

The image generation section 120 performs the hidden surface removal process by a Z-buffer method (depth comparison method or Z-test) using a Z-buffer (depth buffer) that stores the Z-value (depth information) of the drawing pixel. More specifically, the image generation section 120 refers to the Z-value stored in the Z-buffer when drawing the drawing pixel that corresponds to the primitive of the object, and compares the Z-value stored in the Z-buffer with the Z-value of the drawing pixel of the primitive. When the Z-value of the drawing pixel is a Z-value (e.g. small Z-value) that indicates a position on the front side when viewed from the virtual camera, the image generation section 120 draws the drawing pixel, and updates the Z-value stored in the Z-buffer with a new Z value.

The image generation section 120 performs the α-blending process by performing a translucent blending process (e.g., normal α-blending process, additive α-blending process, or subtractive α-blending process) based on the α-value (A-value). Note that the α-value is information that can be linked to each pixel (texel or dot), such as additional information other than the color information. The α-value may be used as mask information, translucency (equivalent to transparency or opacity) information, bump information, or the like.

The sound generation section 130 performs a sound process based on the results of various processes performed by the processing section 100 to generate game sound (e.g., background music (BGM), effect sound, or voice), and outputs the generated game sound to the sound output section 192.

The terminal in this embodiment may be a system dedicated to a single-player mode that allows only one player to play the game, or may be a system that also implements a multi-player mode that allows a plurality of players to play the game.

When a plurality of players play the game, the game image and the game sound provided to the players may be generated using one terminal, or may be generated by a distributed process using a plurality of terminals that are connected via a network (transmission line or communication line) or the like.

2. Process Implementation Method 2-1. Exemplary Terminal

One embodiment of the invention relates to the game process that allows the player to move an object present in the object space (game space) using the terminal 10. The terminal 10 may be a mobile phone (smartphone) as illustrated in FIGS. 2A and 2B. The player can instruct the input direction by touching the display (touch panel display) 12 that includes a touch detection area (display area) with a finger.

The terminal 10 may be a portable game device 1200 illustrated in FIG. 3. The portable game device 1200 includes a display section 1210 that displays a generated image, and an operation section (e.g., slide pad 1232, arrow key 1234, button 1230, and select button 1242) that allows the player to perform an operation input.

The portable game device 1200 may include a sound input device (microphone) that allows the operator to input sound (voice).

The display section 1210 may have a configuration in which a liquid crystal display and a touch panel are stacked so that the position of a touch operation performed on the display area can be detected.

The portable game device 1200 may include a sensor that detects a physical quantity (e.g., acceleration, angular velocity, or speed), and may detect the motion, the posture, the direction, or the like of the portable game device 1200. An acceleration sensor (e.g., piezoelectric acceleration sensor, electrodynamic acceleration sensor, or strain gauge acceleration sensor), a position/direction sensor, a gyrosensor, or the like may be used as the sensor.

2-2. Example of Joystick-Like Input Operation Using Touch Panel

A method that determines the input direction based on the indication position is described below taking an example in which a touch position on the touch panel is used as the indication position (i.e., the indication position is input two-dimensionally).

Figure 4A:
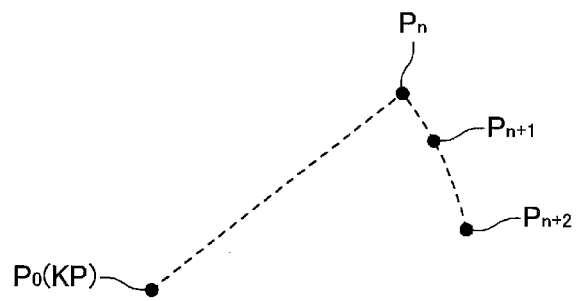
FIGS. 4A and 4B illustrate a joystick-like input operation using a touch panel.
Figure 4B:
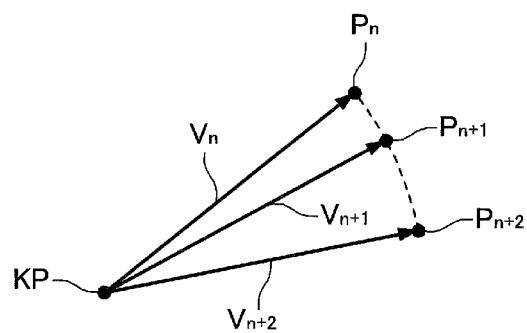

FIGS. 4A and 4B illustrate a joystick-like input operation using the touch panel.

The joystick tilt direction and the joystick tilt amount are respectively processed as the input direction and the input amount of the joystick-like input operation. When the player has tilted the joystick in one direction by some amount, and holds the joystick at the tilted position, position information about the joystick is continuously output, and processed as the input direction and the input amount.

When implementing a joystick-like operation using the touch panel, an X-axis vector value and a Y-axis vector value (when the display screen is a two-dimensional display screen that has an X-axis and a Y-axis) that correspond to the joystick input values (input direction and input amount) are obtained from the touch position on the touch panel. The direction of the vector value corresponds to the joystick tilt direction, and the magnitude of the vector value corresponds to the joystick tilt amount.

As illustrated in FIG. 4A, when the touch positions on the touch panel (display section) at times (frames) t0, . . . , tn, tn+1, and tn+2 are P0, . . . , Pn, Pn+1, and Pn+2, an input vector Vn at the time tn may be a vector that has a reference point KP as the starting point, and has the touch position Pn at the time tn as the terminal point.

The reference point KP may be a predetermined point (e.g., a predetermined position on the display section is set as the reference point), or may be a point determined based on the touch position. The following description is given taking an example in which the touch position at the time t0 (frame) (i.e., the first touch position on the touch panel) is set as the reference point.

In this case, the input vectors (i.e., input directions) acquired at the times (frames) tn, tn+1, and tn+2 are indicated by Vn, Vn+1, and Vn+2, respectively.

The movement of an object (e.g., icon or an object in the game image) displayed on the display section may be controlled using the input vector.

For example, the input vector (i.e., input direction) acquired at the time (frame) tn may be applied to the object at the time tn+1.

2-3. Method

FIGS. 9A to 9C and 26 illustrate an input determination method according to one embodiment of the invention.

Figure 9A:
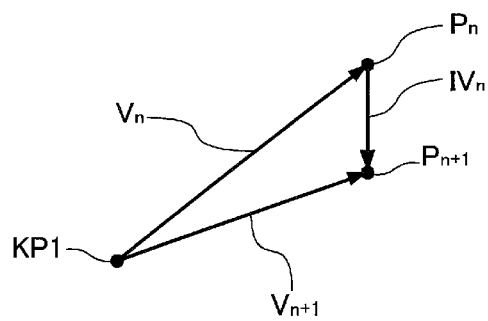
FIGS. 9A to 9C illustrate an input determination method according to one embodiment of the invention.

FIG. 9A illustrates the positional relationship between a reference point KP1 and a touch position Pn at a first timing (tn), and the positional relationship between the reference point KP1 and a touch position Pn+1 at a second timing (tn+1). For example, a point at which the player has touched the touch panel that has not been touched may be set as the reference point KP1. Alternatively, a predetermined position of the display section or a default position may be set as the reference point KP1.

For example, whether or not to change the reference point may be determined based on the angle θ (see FIG. 9B) formed by a first direction (input direction) (Vn) that is determined by the reference point KP1 and the touch position (i.e., indication position) (Pn) at the first timing (tn), and a second direction (IVn) that is determined by the touch position (Pn) at the first timing (tn) and the touch position (Pn+1) at the second timing (tn+1) that follows the first timing (tn), and the reference point may be changed when it has been determined to change the reference point.

Figure 26:
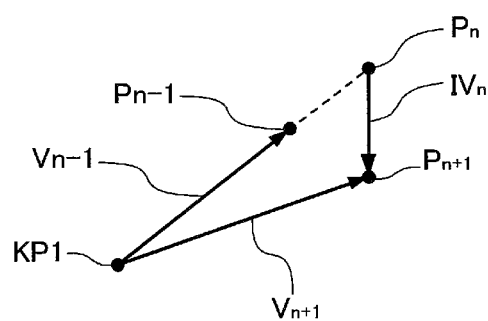
FIG. 26 illustrates an input determination method according to one embodiment of the invention.

As illustrated in FIG. 26, whether or not to change the reference point may be determined based on the angle θ formed by a first direction (input direction) (Vn−1) that is determined by the reference point KP1 and the touch position (i.e., indication position) (Pn−1) at the timing tn−1 that precedes the first timing (tn), and the second direction (IVn) that is determined by the touch position (Pn) at the first timing (tn) and the touch position (Pn+1) at the second timing (tn+1) that follows the first timing (tn).

When a touch position P0 at the time t0 is set as the reference point KP1, whether or not to change the reference point may be determined based on the angle θ (see FIG. 9B) formed by connection lines (Vn and IVn) that connect the touch positions (P0, Pn, and Pn+1) at different timings (t0, tn, and tn+1), and the reference point may be changed when it has been determined to change the reference point.

The new position of the reference point may be determined based on the touch position Pn at the first timing (tn). For example, when changing the reference point to the touch position Pn at the first timing tn, the reference point at the time tn+1 is Pn.

Figure 9B:
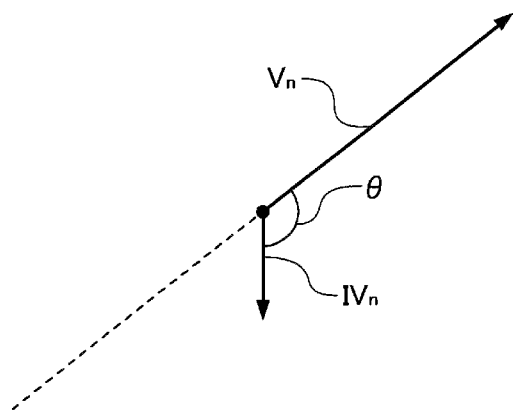
Figure 9C:
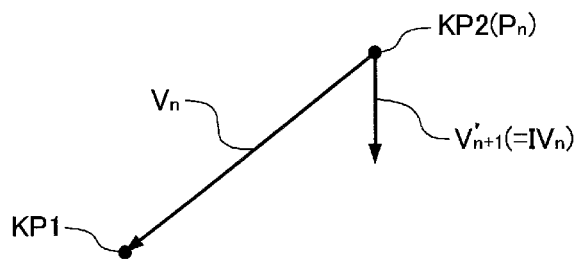

FIG. 9B illustrates a reference point change condition.

The reference point may be changed when the angle θ formed by the first direction (input direction) (Vn) that is determined by the reference point KP1 and the touch position (i.e., indication position) (Pn) at the first timing (tn) or a timing that precedes the first timing (tn), and the second direction (IVn) that is determined by the touch position (Pn) at the first timing (tn) or a timing that precedes the first timing (tn) and the touch position (Pn+1) at the second timing (tn+1) that follows the first timing (tn), satisfies the reference point change condition. For example, it may be determined that the reference point change condition is satisfied when $\alpha<\theta<\beta$ or $\alpha\le\theta\le\beta$ (e.g., $\alpha=50°$ and $\beta=210°$).

The reference point change timing may be the second timing (tn+1). In this case, the input vector V'n+1 at the second timing (tn+1) is the vector IVn that has a new reference point KP2 (Pn) as the starting point, and has the touch position (Pn+1) at the second timing (tn+1) as the terminal point (see FIG. 9C).

Figure 10A:
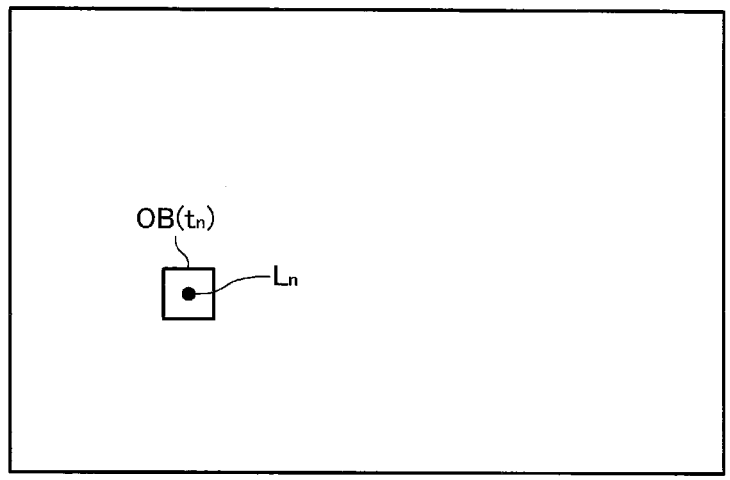
FIGS. 10A to 10C illustrate an example of an object movement control process when changing a reference point.
Figure 10B:
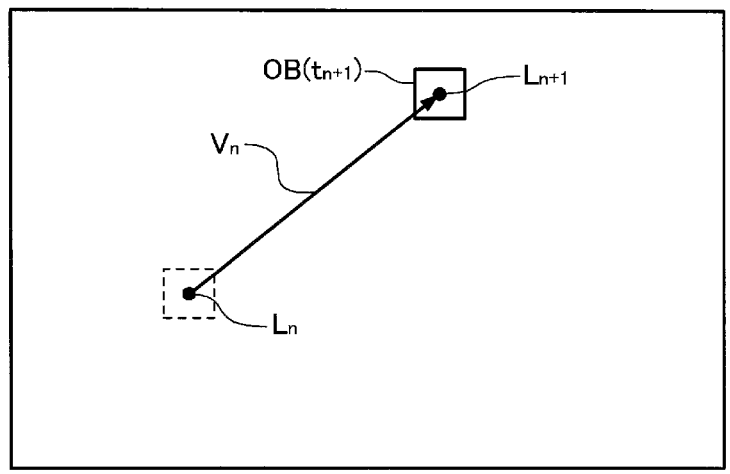
Figure 10C:
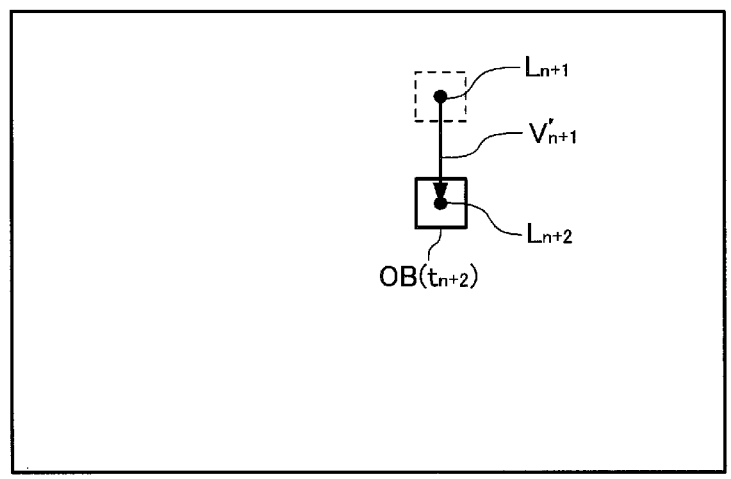

FIGS. 10A to 10C illustrate an example of the object movement control process (two-dimensional object movement control process) when changing the reference point.

For example, when the position of an object OB displayed on the display section at the time tn is Ln, and the input vector at the time tn is Vn, the position of the object OB at the time tn+1 is Ln+1 that is calculated by applying the input vector Vn to the position Ln of the object OB at the time tn. Therefore, the object OB is moved from the position Ln to the position Ln+1 within the display screen.

The position of the object OB at the time tn+2 is Ln+2 that is calculated by applying the input vector V'n+1 to the position Ln+1 of the object OB at the time tn+1. Therefore, the object OB is moved from the position Ln+1 to the position Ln+2 within the display screen.

Note that the object OB within the display screen need not be touched when moving the object OB. When the object OB that is subjected to the movement control process is selected, the object OB can be moved using an input vector obtained by sliding the touch position at an arbitrary position within the screen (i.e., the object OB need not be touched).

2-4. Significant Effects over Comparative Example

Figure 5A:
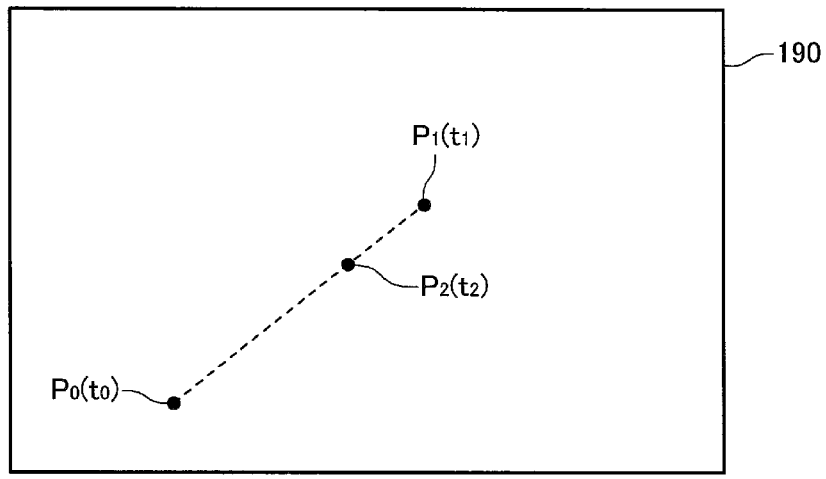
FIGS. 5A to 5C illustrate a comparative example of a movement control process using a joystick-like input operation.
Figure 5B:
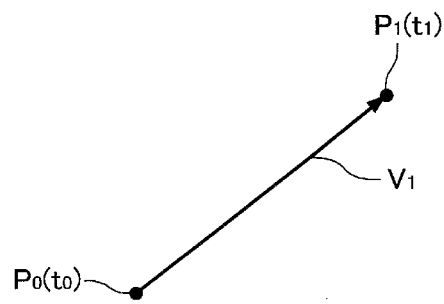
Figure 5C:
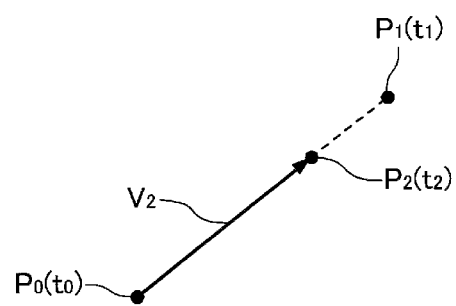

FIGS. 5A to 5C illustrate a comparative example of the movement control process using a joystick-like input operation.

As illustrated in FIG. 5A, the touch positions on the touch panel (display section 190) at times (frames) t0, t1, and t2 are P0, P1, and P2, and the reference point is P0. In this case, the input vector (i.e., input direction) at the time (frame) t1 is V1 (i.e., a vector that has the reference point P0 as the starting point, and has the position P1 as the terminal point) (see FIG. 5B). The input vector (i.e., input direction) at the time (frame) t2 is V2 (i.e., a vector that has the reference point P0 as the starting point, and has the position P2 as the terminal point) (see FIG. 5C).

Figure 6A:
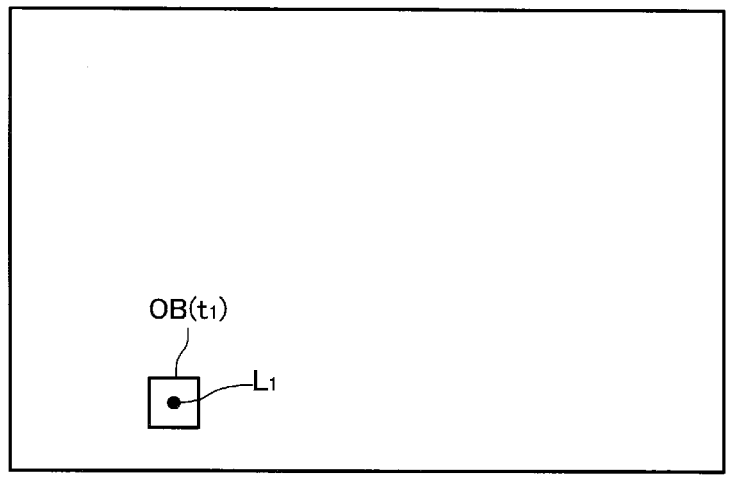
FIGS. 6A to 6C illustrate an example of an object movement control process that corresponds to the input operation of the comparative example in FIGS. 5A to 5C.
Figure 6B:
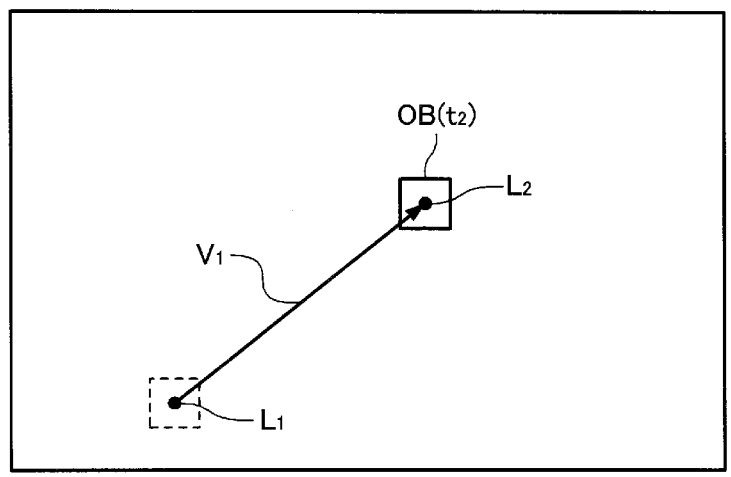
Figure 6C:
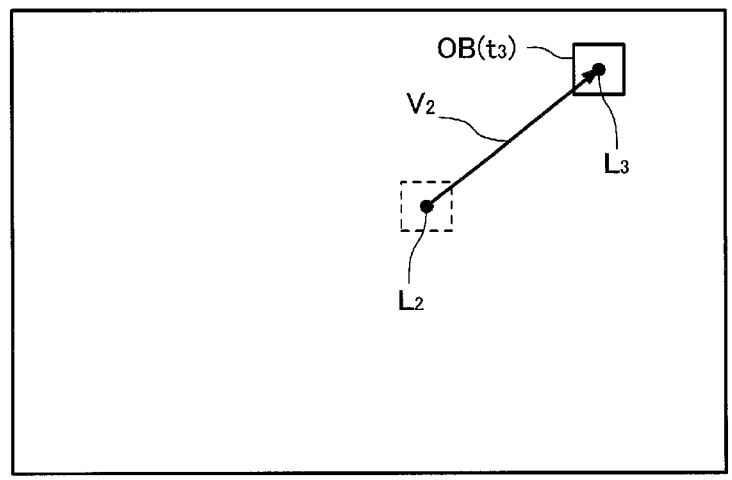

FIGS. 6A to 6C illustrate an example of the object movement control process (two-dimensional object movement control process) that corresponds to the input operation of the comparative example illustrated in FIGS. 5A to 5C.

For example, when the position of the object OB displayed on the display section at the time t1 is L1, and the input vector at the time t1 is V1, the position of the object OB at the time t2 is L2 that is calculated by applying the input vector V1 to the position L1 of the object OB at the time t1. Therefore, the object OB is moved from the position L1 to the position L2 within the display screen.

The position of the object OB at the time t3 is L3 that is calculated by applying the input vector V2 to the position L2 of the object OB at the time t2. Therefore, the object OB is moved from the position L2 to the position L3 within the display screen.

However, since the touch position on the touch panel changes from the position P1 to the position P2 when the player has returned the touch position from the position P1 to the position P2, it is likely that the player has desired to move the object OB in the direction opposite to the direction at the time t1. In this case, the player may feel inconsistency in the object movement control process.

Figure 23A:
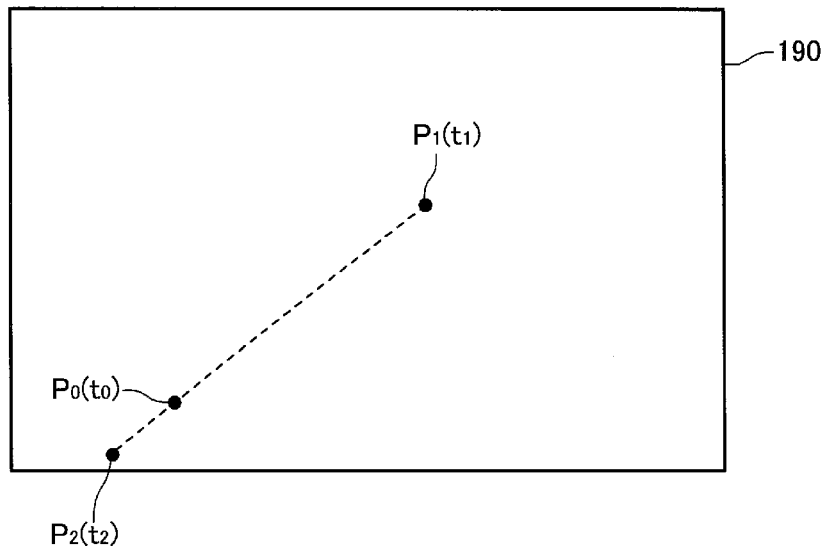
FIGS. 23A to 23C illustrate an operation in the comparative example.
Figure 23B:
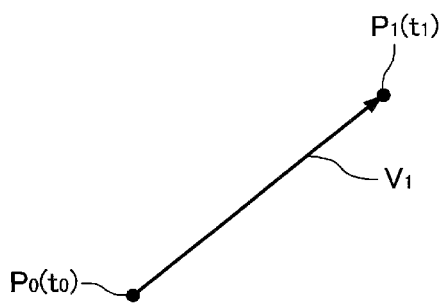
Figure 23C:
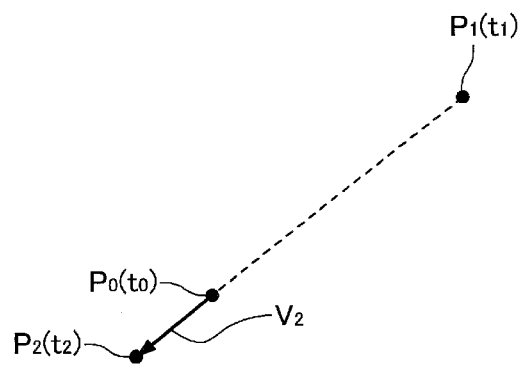

FIGS. 23A to 23C illustrate an operation (touch position) in the comparative example when the player desires to move the object OB in the direction opposite to the direction at the time t1. In this case, the direction of the input vector V1 at the time t1 (see FIG. 23B) must be opposite to the direction of the input vector V2 at the time t2 (see FIG. 23C). In order to implement the above operation without removing a finger from the touch panel, it is necessary to touch the position P1, and then slide the touch position to the position P2 through the reference point P0. However, the magnitude of the vector V2 is smaller than the magnitude of the vector V1 although the moving distance from the position P1 to the position P2 is longer than the moving distance from the position P0 to the position P1. Specifically, since the moving distance of the touch position does not coincide with the magnitude of the input vector, the player may feel inconsistency. Moreover, since the area of the display section is limited, movement in the opposite direction is limited when the reference point (i.e., the touch position P0 at the time t0) is positioned on the end of the screen, so that the player may not be able to perform the desired input operation.

Figure 7A:
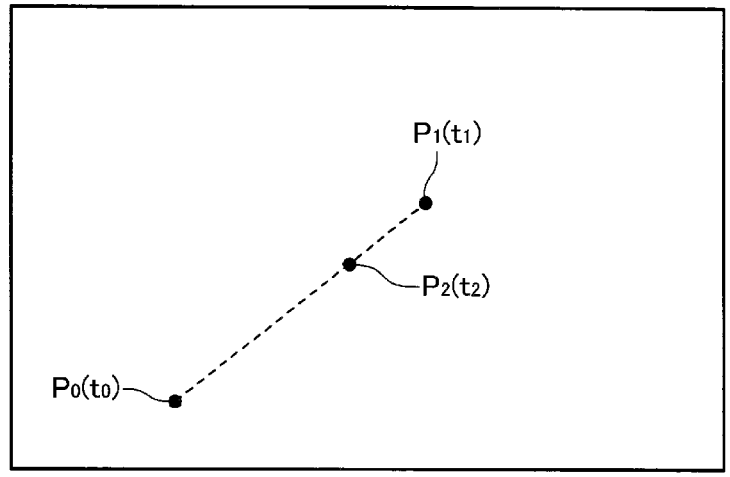
FIGS. 7A to 7C illustrate an example of a movement control process according to one embodiment of the invention using a joystick-like input operation.
Figure 7B:
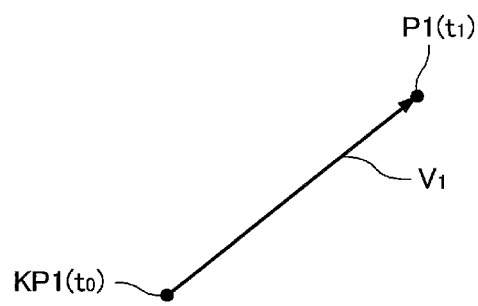
Figure 7C:
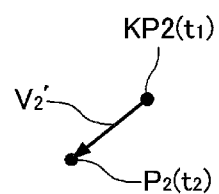

FIGS. 7A to 7C illustrate an example of the movement control process using a joystick-like input operation.

As illustrated in FIG. 7A, the touch positions on the touch panel (display section 190) at the times (frames) t0, t1, and t2 are P0, P1, and P2, and the reference point is P0. In this case, the input vector (i.e., input direction) at the time (frame) t1 is V1 (i.e., a vector that has the reference point P0 as the starting point, and has the position P1 as the terminal point) (see FIG. 7B).

When the touch position on the touch panel has changed from the position P1 to the position P2 (i.e., when the player has returned the touch position from the position P1 to the position P2), it is determined that the reference point change condition is satisfied, and the reference point is changed from the position P0 to the position P1. In this case, the input vector at the time t2 is V'2 (i.e., a vector that has the new reference point P1 as the starting point, and has the position P2 as the terminal point) (see FIG. 7C).

Figure 8A:
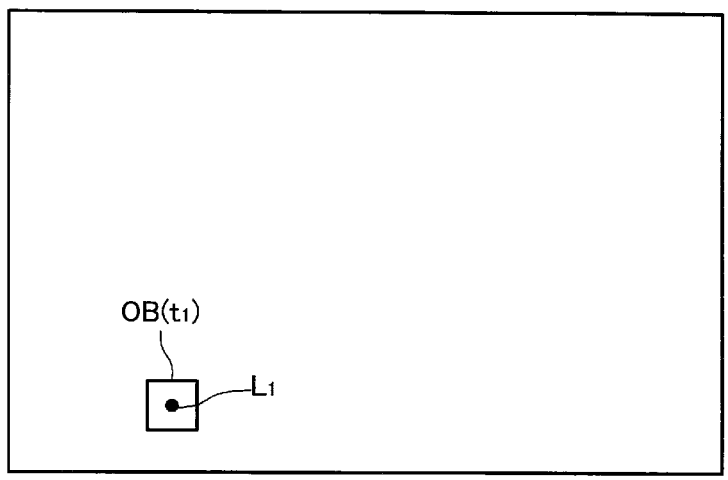
FIGS. 8A to 8C illustrate an example of an object movement control process that corresponds to the input operation in FIGS. 7A to 7C.
Figure 8B:
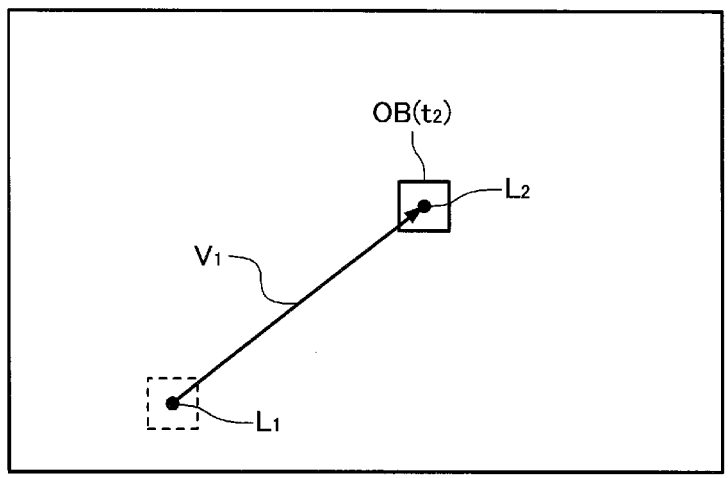
Figure 8C:
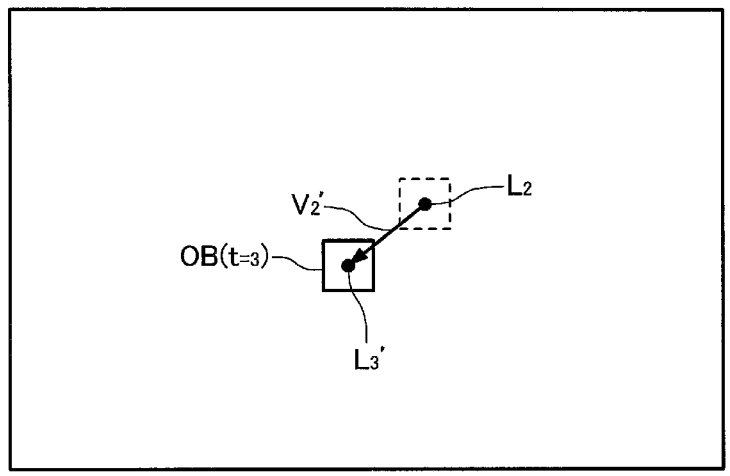

FIGS. 8A to 8C illustrate an example of the object movement control process (two-dimensional object movement control process) that corresponds to the input operation illustrated in FIGS. 7A to 7C.

For example, when the position of the object OB displayed on the display section at the time t1 is L1, and the input vector at the time t1 is V1, the position of the object OB at the time t2 is L2 that is calculated by applying the input vector V1 to the position L1 of the object OB at the time t1. Therefore, the object OB is moved from the position L1 to the position L2 within the display screen.

The position of the object OB at the time t3 is L'3 that is calculated by applying the input vector V'2 to the position L2 of the object OB at the time t2. Therefore, the object OB is moved from the position L2 to the position L'3 within the display screen.

Since the touch position on the touch panel changes from the position P1 to the position P2 when the player has returned the touch position from the position P1 to the position P2, it is possible to prevent a situation in which the player feels inconsistency with the input operation by moving the object OB in the opposite direction.

2-5. Movement Control Process

The movement control process may be performed based on the input vector (i.e., input direction) obtained by the above method. The target of the movement control process may be an object on a two-dimensional plane, or may be an object in a three-dimensional space. The target of the movement control process may be a display object, or may be a non-display object (e.g., the virtual camera or a first-person viewpoint player object).

FIGS. 25A to 25C illustrate an example of the movement control process according to one embodiment of the invention. The following description is given taking an example in which the movement control process is performed on icon objects 410-1, 410-2, and 410-3 displayed on the display section of a smartphone or a tablet terminal.

For example, when the position of the icon object iOB (410-3) displayed on the display section of the smartphone at the time tn is Ln, and the input vector at the time tn is Vn, the position of the icon object iOB (410-3) at the time tn+1 is Ln+1 that is calculated by applying the input vector Vn to the position Ln of the icon object iOB (410-3) at the time tn. Therefore, the icon object iOB (410-3) is moved from the position Ln to the position Ln+1 on the display section of the smartphone.

The position of the icon object iOB (410-3) at the time tn+2 is Ln+2 that is calculated by applying the input vector V'n+1 to the position Ln+1 of the icon object iOB (410-3) at the time tn+1. Therefore, the icon object iOB (410-3) is moved from the position Ln+1 to the position Ln+2 on the display section of the smartphone.

The input vector is a vector that connects the reference point and the touch position. The reference point may be a point at which the player has touched the display section that has not been touched, or may be a predetermined position of the display section or a default position.

The player need not touch the icon object 410-3 displayed within the display screen when moving the icon object 410-3. When the icon object that is subjected to the movement control process is selected, the icon object can be moved using an input vector obtained by sliding the touch position at an arbitrary position within the screen (i.e., the icon object need not be touched).

Figure 11A:
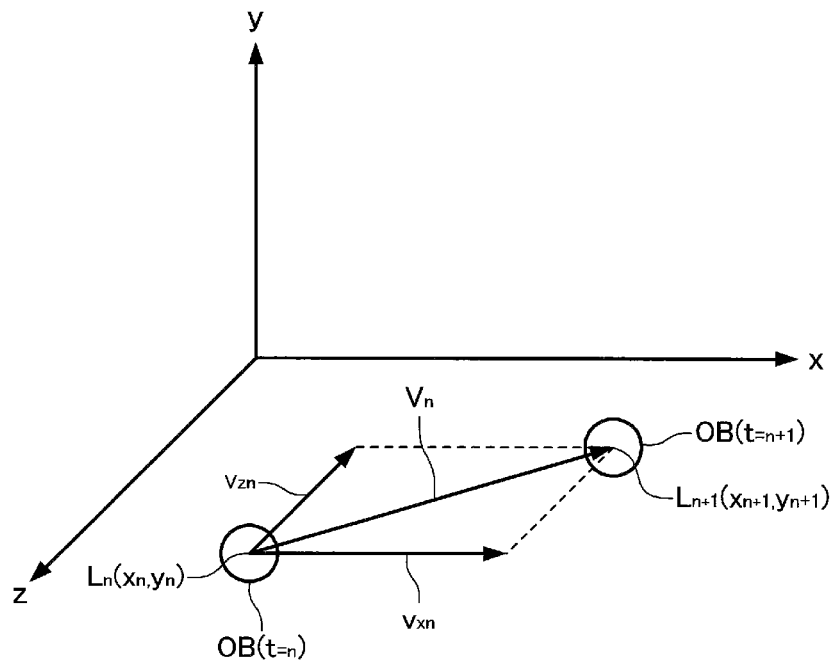
FIGS. 11A and 11B illustrate an example of an object movement control process according to one embodiment of the invention.
Figure 11B:
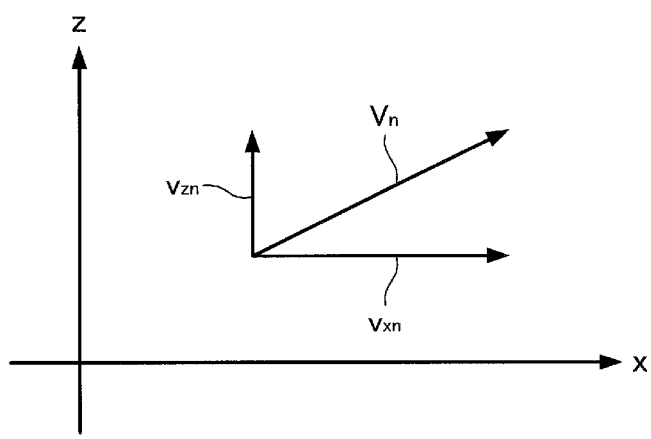

FIGS. 11A and 11B illustrate an example of the movement control process.

An object OB illustrated in FIG. 11A is a moving object that moves in the object space (virtual three-dimensional space). The movement of the object OB is controlled based on the input vector. For example, when the position of the object OB at the time tn is Ln(xn, yn), and a two-dimensional input vector Vn(vxn, vyn) (see FIG. 11B) has been acquired based on the touch position on the touch panel, the position of the object OB at the time tn+1 may be Ln+1 (xn+1=xn+vxn, yn+1=yn+vyn). In this case, the two-dimensional input vector Vn(vxn, vyn) may be given as a value in a viewpoint coordinate system.

Figure 12:
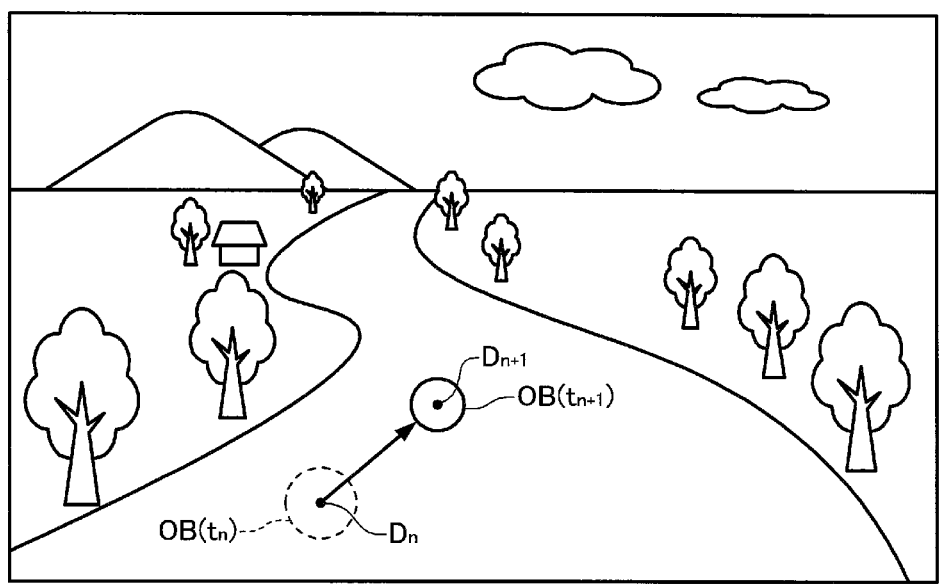
FIG. 12 illustrates an image of an object space viewed from a virtual camera.

FIG. 12 illustrates an image of the object space viewed from the virtual camera. The object that is displayed at a position D1 (i.e., a position corresponding to the position Ln in the object space illustrated in FIG. 11A) of the display section (screen coordinate system) at the time tn moves to a position D2 (i.e., a position corresponding to the position Ln+1 in the object space illustrated in FIG. 11A) of the display section (screen coordinate system) at the time tn+1.

2-6. Reference Point Reset Control Process

The reference point may be reset based on predetermined input information.

For example, the reference point may be reset when a predetermined button has been pressed, or when the detection result for acceleration or angular acceleration applied to the terminal indicates a predetermined state.

Figure 24A:
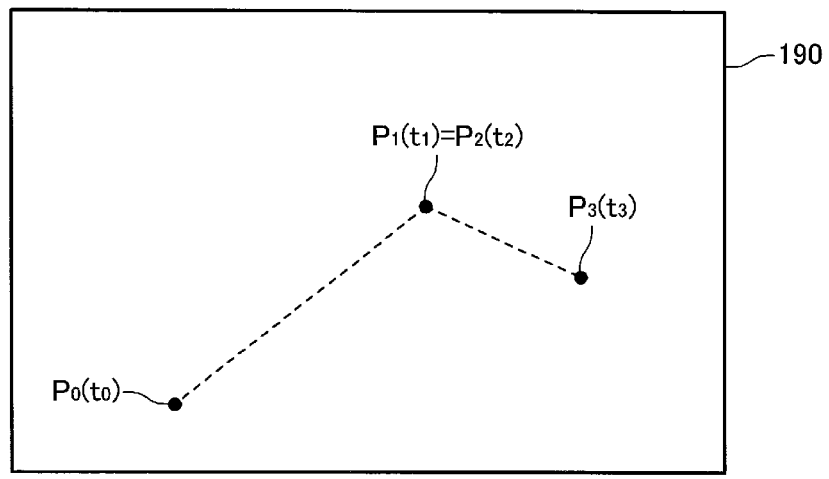
FIGS. 24A to 24C illustrate a reference point reset process.
Figure 24B:
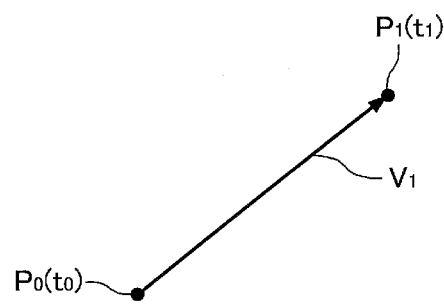
Figure 24C:
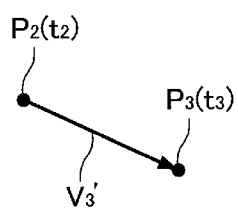

FIGS. 24A to 24C illustrate the reference point reset control process.

As illustrated in FIG. 24A, the touch positions on the touch panel (display section 190) at times (frames) t0, t1, t2, and t3 are P0, P1, P2, and P3 (P1=P2), and the reference point at the time t0 is P0. In this case, the input vector (i.e., input direction) at the time (frame) t1 is V1 (i.e., a vector that has the reference point P0 as the starting point, and has the position P1 as the terminal point) (see FIG. 24B). When a reset input has been detected at the time t2 (e.g., when a predetermined button has been pressed, or when the detection result for acceleration or angular acceleration applied to the terminal indicates a predetermined state), the reference point is reset to a position other than the position P0. The new reference point may be the touch position (P2) when the reset input has been detected. In this case, the reference point is changed from the position P0 to the position P2 at the time t2.

When the touch position on the touch panel has changed from the position P2 to the position P3 at the time t3, the input vector at the time t3 is V'3 (i.e., a vector that has the new reference point P2 as the starting point, and has the position P3 as the terminal point) (see FIG. 24C).

Figure 13:
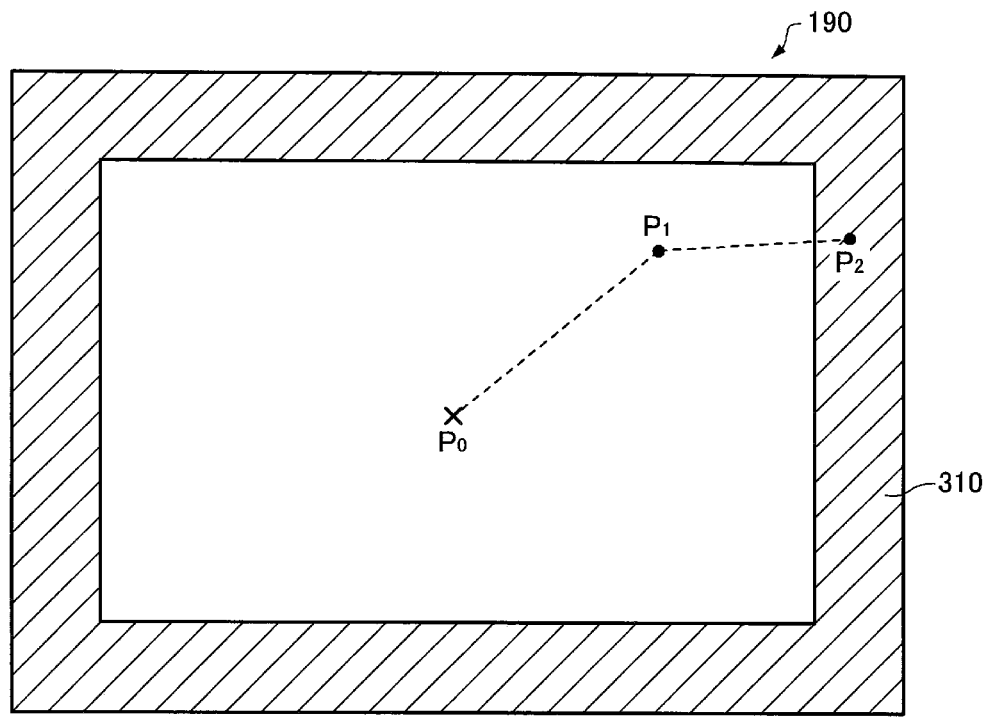
FIG. 13 illustrates a reference point reset control process utilizing a reset area.
Figure 14:
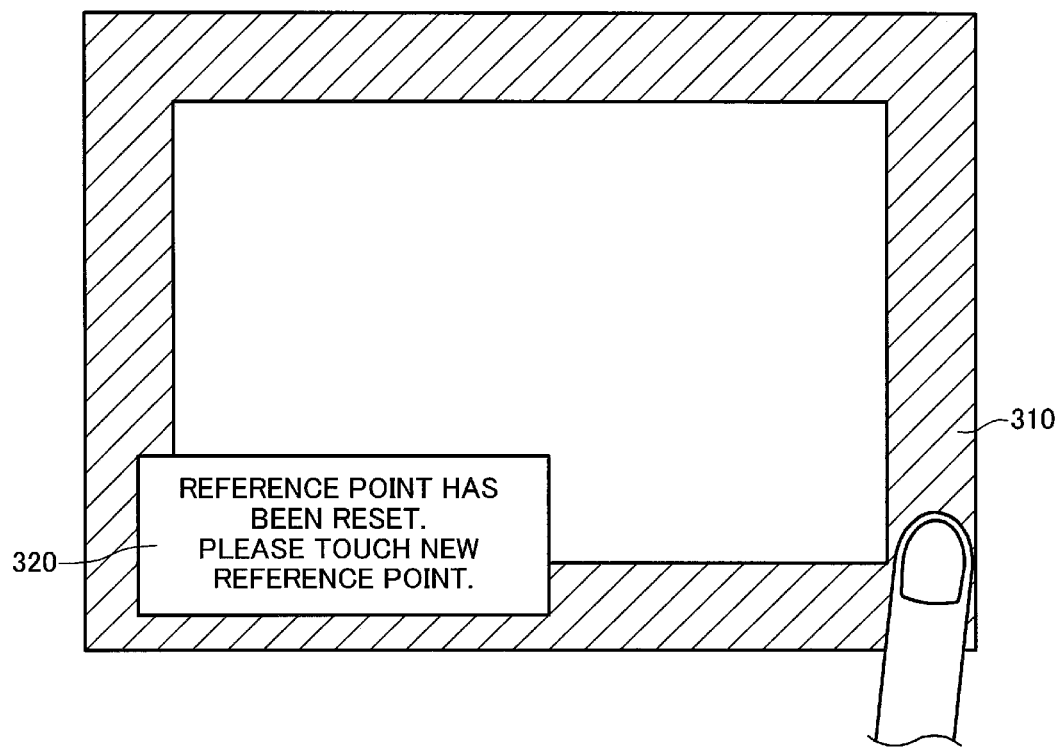
FIG. 14 illustrates a reference point reset control process utilizing a reset area.

FIGS. 13 and 14 illustrate the reference point reset control process that utilizes a reset area.

As illustrated in FIG. 13, a predetermined area 310 (peripheral area) of the display section 190 may be set as a reset area, and whether or not the reset area has been touched may be determined based on information about the touch position on the display section 190. The reference point may be reset when it has been determined that the reset area has been touched.

For example, the touch positions on the display section 190 (touch panel) at the times (frames) t0, t1, and t2 are P0, P1, and P2, and the reference point at the time t0 is P0. In this case, since the touch position P2 at the time t2 (frame) belongs to the reset area, the reference point is reset at the time t2. Specifically, the reference point that is set to the position P0 at the time t1 (frame) is reset to a position other than the position P0 at the time t2.

When the reference point has been reset, the next touch position may be set as a new reference point, or a default position may be set as a new reference point.

It is likely that the player touches the reset area that is set to the peripheral area of the display section when the player moves the touch position from the center area of the screen toward the edge of the screen (see FIG. 13), or when the touch position almost reaches the edge of the screen. Therefore, it is advantageous for the player to cancel the touch state, and perform a touch operation at a new touch position.

When the reference point has been reset, a reference point reset message 320 (see FIG. 14) may be output to prompt the player to set a new reference point.

2-7. Input Mode Change Control Process

A plurality of input modes may be provided, and the input determination process using the indication position may be changed corresponding to each input mode.

For example, the input direction may be calculated from the reference point and the indication position as the input information when the current input mode is a first input mode, and another input determination process may be performed using the indication position when the current input mode is an input mode other than the first input mode.

For example, the first input mode may be an input mode in which a joystick-like input operation is performed using a touch panel, and the input mode may be changed from the first input mode to another input mode when a predetermined button has been pressed, or when the detection result for acceleration or angular acceleration applied to the terminal indicates a predetermined state during the first input mode.

For example, when the input information is acquired using a touch panel that can detect a plurality of touch positions at the same time, it may be determined that the input information indicates a predetermined state when the second touch operation has been detected when the player performs a joystick-like input operation, and the input mode may be changed from the first input mode to another input mode.

2-8. Movement Control Target Object Change Control Process

The movement control target object may be changed based on the information about the touch position, and the movement control process may be performed on the new movement control target object based on the input direction.

FIGS. 15A, 15B, 16A and 16B illustrate the movement control target object change control process.

Figure 15A:
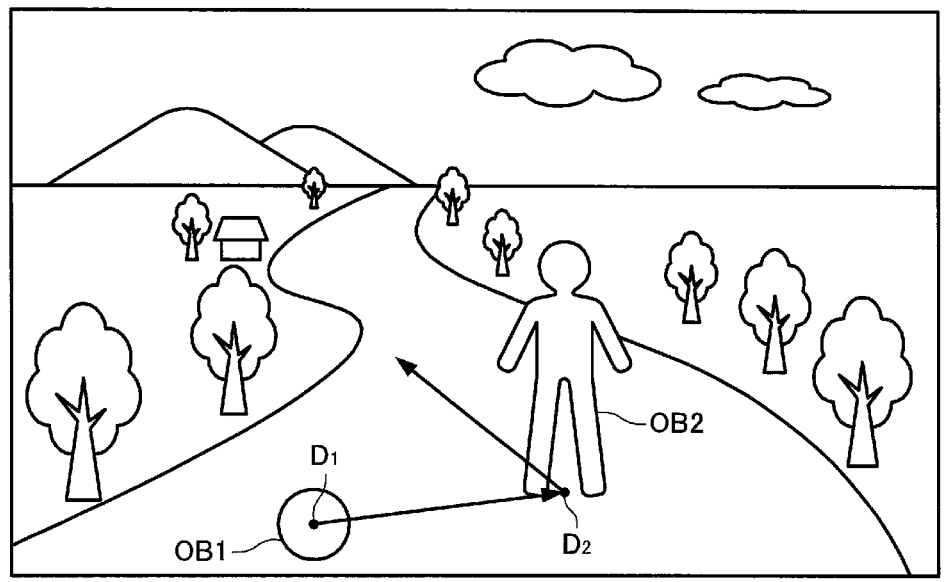
FIGS. 15A and 15B illustrate a movement control target object change control process.
Figure 15B:
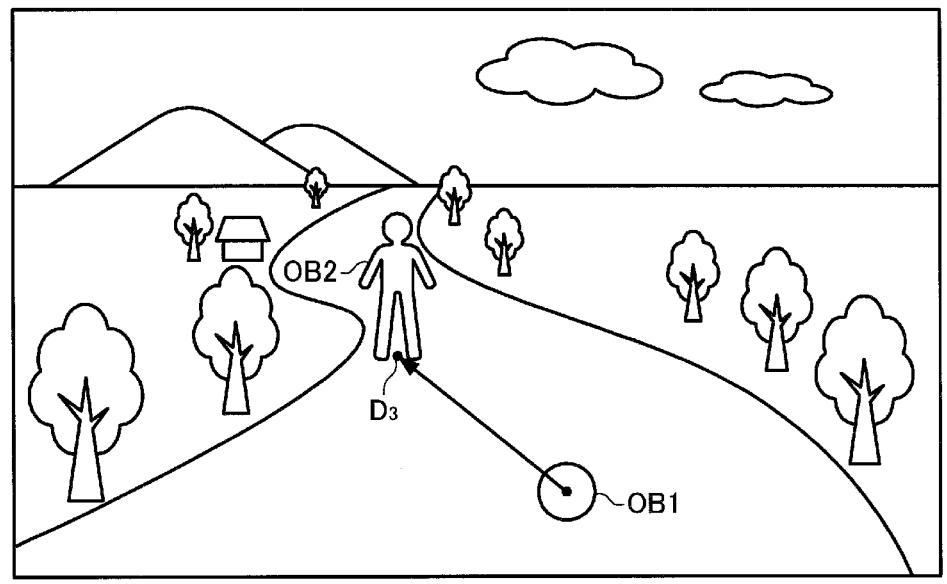

FIGS. 15A and 15B illustrate an example in which the movement control target object is changed from a first object OB1 to a second object OB2. When the first object OB1 has been touched, and an operation that slides the touch position on the touch panel (joystick-like input operation using the touch panel) has been performed, the first object OB1 is moved from a position D1 to a position D2 corresponding to the resulting input vector.

When the second object OB2 has then been touched, the movement control target object is changed from the first object OB1 to the second object OB2. When an operation that slides the touch position on the touch panel (joystick-like input operation using the touch panel) has then been performed, the second object OB2 is moved from the position D1 to the position D2 corresponding to the resulting input vector.

Figure 16A:
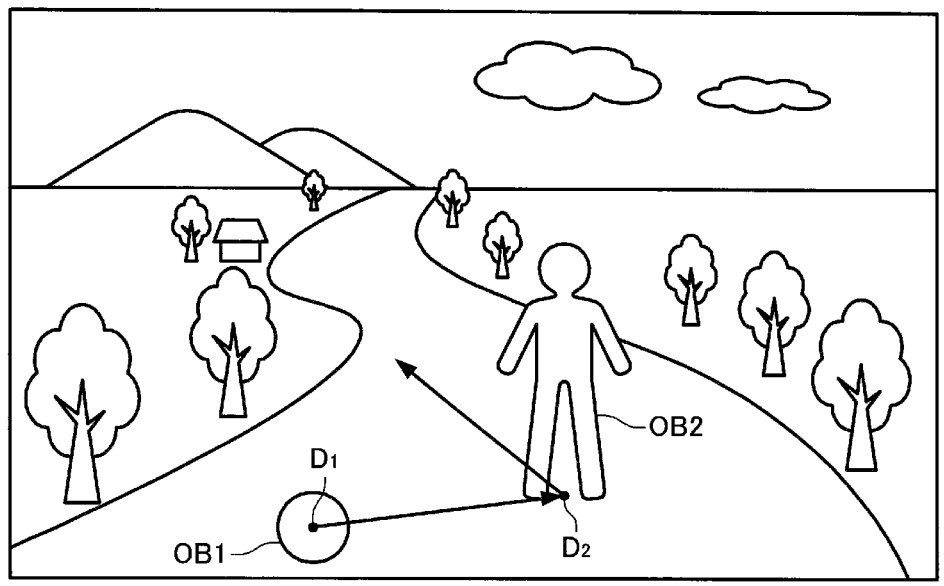
FIGS. 16A and 16B illustrate a movement control target object change control process.
Figure 16B:
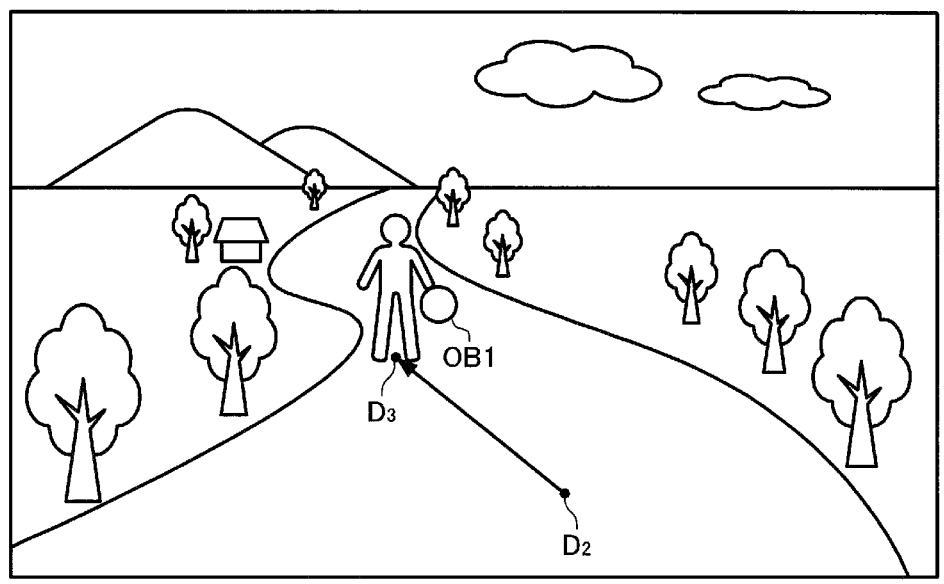

FIGS. 16A and 16B illustrate an example in which the movement control target object is changed from the first object OB1 to the first object OB1 and the second object OB2. When the first object OB1 has been touched, and an operation that slides the touch position on the touch panel (joystick-like input operation using the touch panel) has been performed, the first object OB1 is moved from a position D1 to a position D2 corresponding to the resulting input vector.

When the second object OB2 has then been touched, the movement control target object is changed from the first object OB1 to the first object OB1 and the second object OB2. When an operation that slides the touch position on the touch panel (joystick-like input operation using the touch panel) has then been performed, the first object OB1 and the second object OB2 are moved from the position D2 to the position D3 corresponding to the resulting input vector.

3. Process

Figure 17:
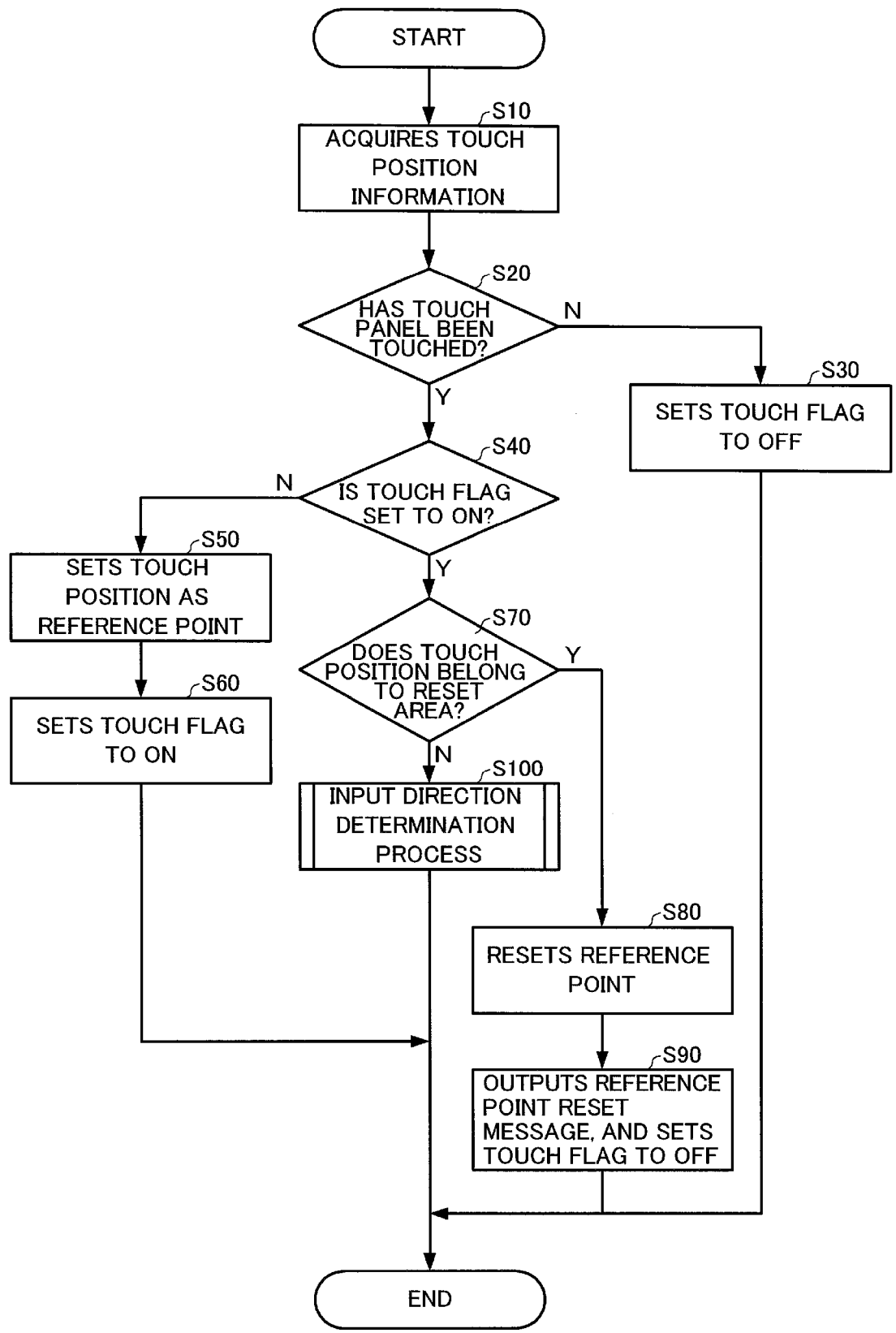
FIG. 17 is a flowchart illustrating the flow of an input determination process according to one embodiment of the invention.

FIG. 17 is a flowchart illustrating the flow of the input determination process according to one embodiment of the invention.

The process illustrated in FIG. 17 is performed every frame.

The touch position information is acquired every frame (step S10). When the touch position information indicates that the touch panel is not touched (N in step S20), a touch flag is set to OFF (step S30). When the touch position information indicates that the touch panel is touched (Y in step S20), and the touch flag is not set to ON (N in step S40), the touch position is set as the reference point (step S50), and the touch flag is set to ON (step S60). When the touch flag is not set to ON (N in step S40), and the touch position belongs to the reset area (Y in step S70), the reference point is reset (step S80), the reference point reset message is output, and the touch flag is set to OFF (step S80). When the touch position does not belong to the reset area (N in step S70), the input direction determination process (step S100) is performed.

Figure 18:
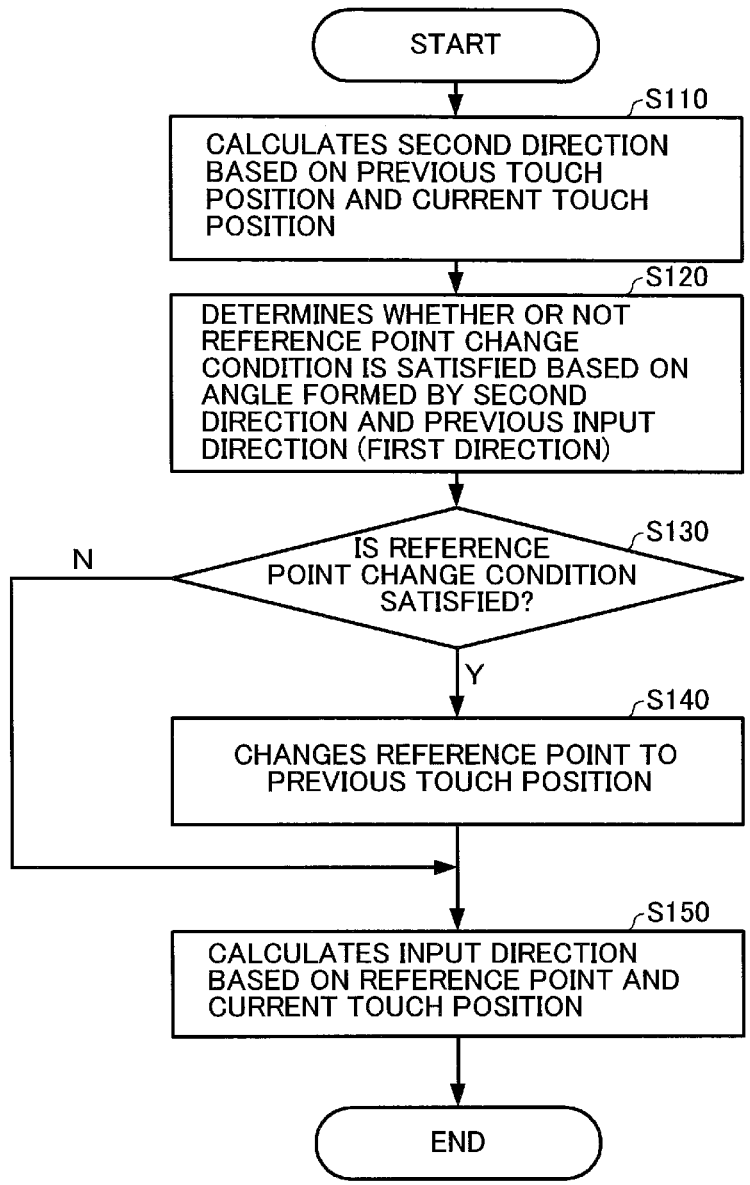
FIG. 18 is a flowchart illustrating the flow of an input direction determination process according to one embodiment of the invention.

FIG. 18 is a flowchart illustrating the flow of the input direction determination process (step S100 in FIG. 17).

The second direction is calculated based on the previous touch position and the current touch position (step S110). Whether or not the reference point change condition is satisfied is determined based on the angle formed by the second direction and the previous input direction (first direction) (step S120).

When it has been determined that the reference point change condition is satisfied (Y in step S130), the reference point is changed to the previous touch position (step S140). The input direction is calculated based on the reference point and the current touch position (step S150). Note that the input vector that has the reference point as the starting point, and has the current touch position as the terminal point may also be calculated, and the control process using the joystick-like input operation may be performed using the direction of the input vector as the joystick tilt direction (input direction), and the magnitude of the input vector as the joystick tilt amount.

4. Network System 4-1. First Online Game Processing Example

A plurality of terminals 10 may exchange data via a network to implement a battle game. Specifically, a peer-to-peer online game may be implemented according to one embodiment of the invention.

Figure 19:
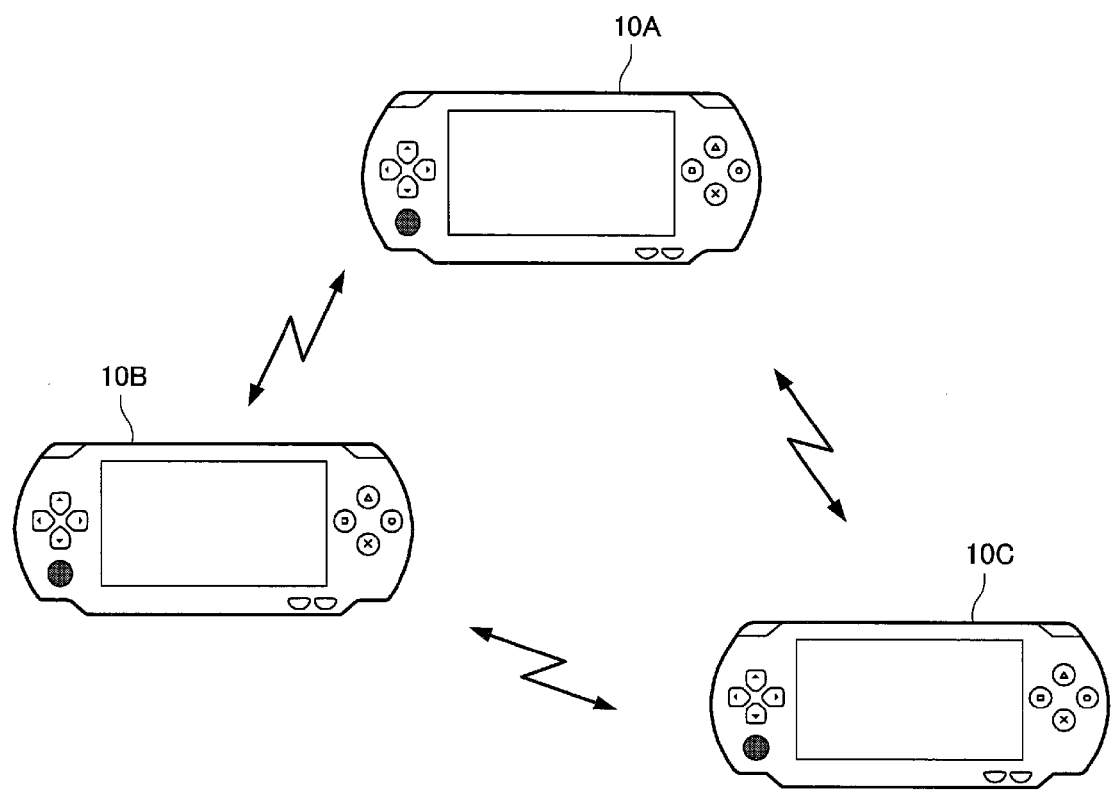
FIG. 19 illustrates a network system.
Figure 20:
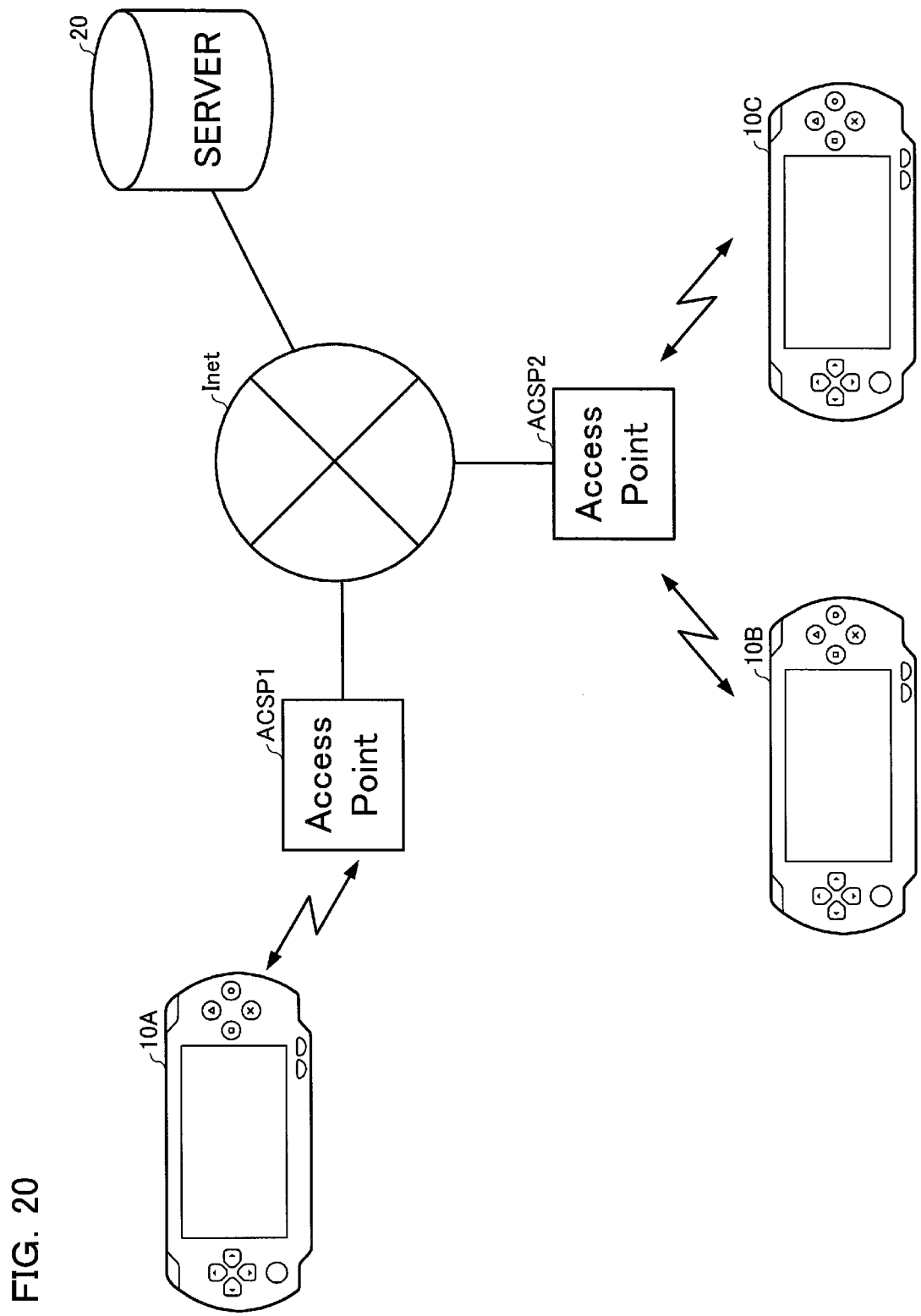
FIG. 20 illustrates a network system.

FIGS. 19 and 20 illustrate configuration of a network system according to one embodiment of the invention. For example, the network system may be configured so that players who respectively possess terminals 10A to 10C can enjoy match play or cooperative play via wireless communication. Note that the terminals 10A to 10C communicate via cable communication.

The wireless communication mode is classified into an ad hoc mode in which the terminals 10A to 10C construct a network in an autonomous decentralized manner, and directly exchange a packet that includes the game information and the like (see FIG. 19), and an infrastructure mode in which the terminals 10A to 10C indirectly exchange a packet that includes the game information and the like via an access point ACSP1 (terminal 10A) or ACSP2 (terminals 10B and 10C) (see FIG. 20). In the infrastructure mode, the terminals 10A to 10C can access an Internet Inet (public telecommunication network) via the access point ACSP1 or ACSP2. The terminals 10A to 10C can exchange a packet including game information, firmware update information, and the like with the server 20 connected to the Internet Inet via the access point ACSP1 or ACSP2.

The network system may perform the game process that causes a character operated using the terminal 10A to battle a character operated using the terminal 10B. The network system may perform the game process that causes a first group that includes a character operated using the terminal 10A and a character operated using the terminal 10B to battle a second group that includes a character operated using the terminal 10C and a character operated using another terminal.

Each terminal causes another character (i.e., a character operated by the player who operates another terminal) disposed in the object space to move and make a motion based on data (e.g., movement information) received via the network. Specifically, each terminal 10 exchanges data including position control data and movement control data about the character, analog lever/button input information, the acceleration value, and the like via a network.

For example, the terminal 10A transmits the position of a character operated using the terminal 10A to the terminal 10B at the drawing frame rate (e.g., every 1/60th of a second). The terminal 10B also transmits the position of a character operated using the terminal 10B to the terminal 10A at the drawing frame rate.

Each terminal is configured so that the control process using a joystick-like input operation can be performed based on the touch position (i.e., indication position) on the touch panel.

4-2. Second Online Game Processing Example

Figure 21:
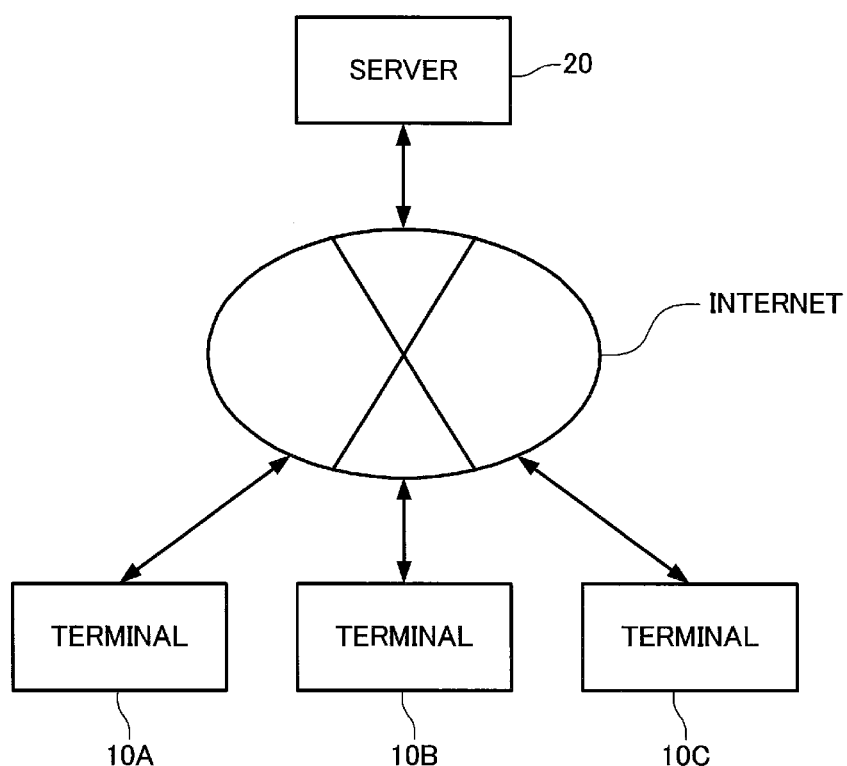
FIG. 21 illustrates a network system.

A client-server online game may be implemented according to one embodiment of the invention. Specifically, some of the processes performed by the terminal 10 (e.g., at least one of the processes performed by the processing section 100) may be performed by the server 20. As illustrated in FIG. 21, the server 20 may be connected to a plurality of terminals 10A to 10C via a network (e.g., Internet), and may receive input information from the terminals 10A to 10C. The server 20 may generate an image based on the received first input information, second input information, and third input information, and may transmit the generated image to the terminals 10A to 10C.

The server 20 may perform the input determination process on each terminal based on the touch position (i.e., indication position) on the touch panel that has been received from each terminal.

For example, the server 20 may function as a server that provides the user with a social networking service (SNS) (i.e., community service).

The server 20 may have a web server function. For example, when the terminal 10 includes a web browser that allows the user to browse a web page (Hyper Text Markup Language (HTML) format data), the server 20 may provide a browser game to the terminal 10. For example, the server 20 provides a web page (e.g., an address (Uniform Resource Locator (URL)) for providing a game service) to the terminal 10. When the server 20 has received a request for the address of the web page from the terminal 10, the server 20 may transmit the game data of the web page to the terminal 10, and perform the game process based on the input information received from the terminal 10. Note that the game data includes various parameters used for the browser game process, image data (e.g., replacement screen image data, image data including a character CH and an enemy character E, and game result image), sound data, and the like.

Figure 22:
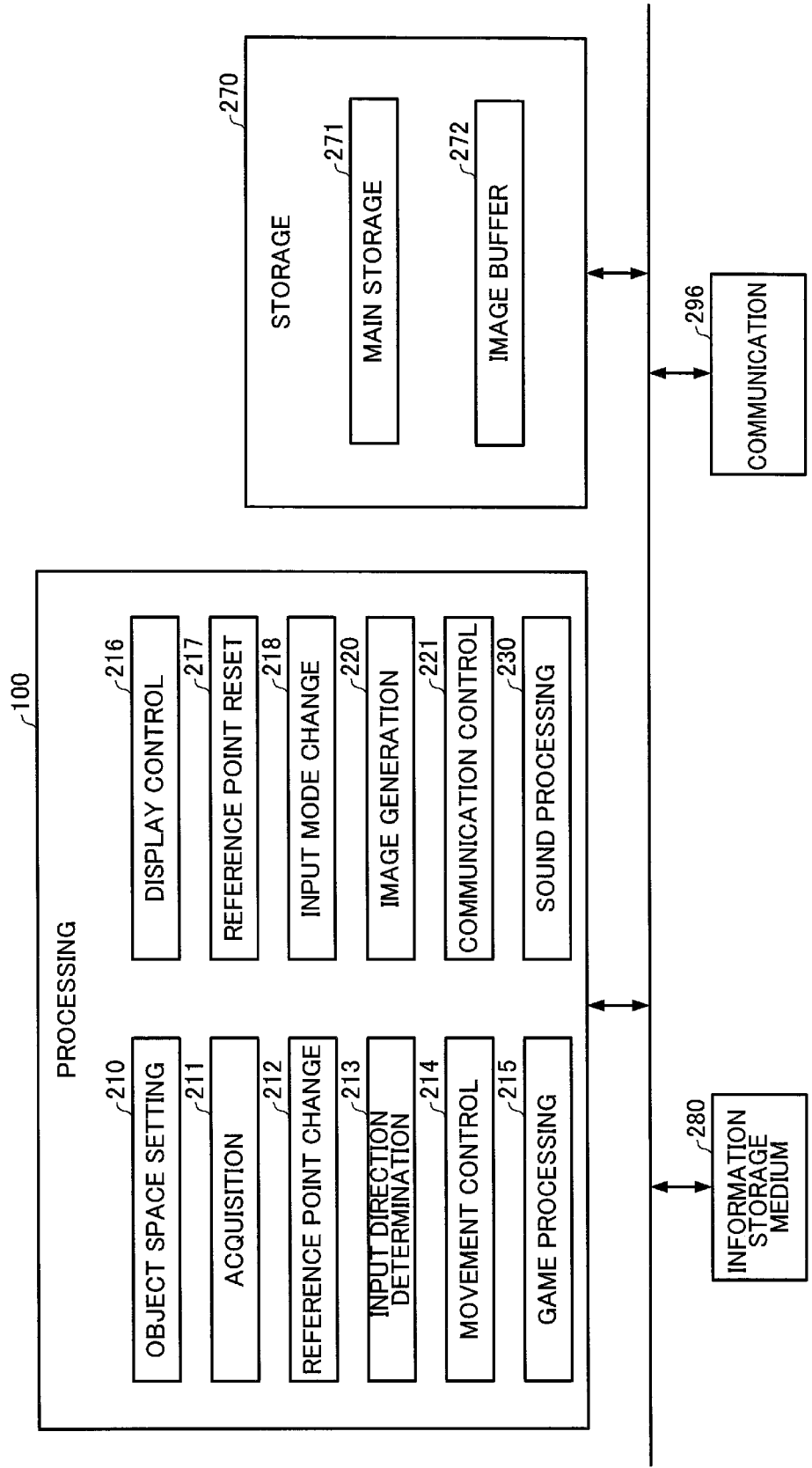
FIG. 22 is a configuration diagram of a server.

FIG. 22 is a functional block diagram illustrating the server 20. Note that the server 20 may have a configuration in which some of the elements (sections) illustrated in FIG. 22 are omitted.

A storage section 270 serves as a work area for a processing section 200, a communication section 296, and the like. The function of the storage section 270 may be implemented by a RAM (VRAM) or the like. An object data storage section 273 stores various types of object data.

An information storage medium 280 (computer-readable medium) stores a program, data, and the like. The function of the information storage medium 280 may be implemented by an optical disk (CD or DVD), a magneto-optical disk (MO), a magnetic disk, a hard disk, a magnetic tape, a memory (ROM), or the like. The processing section 200 performs various processes in this embodiment based on a program (data) stored in the information storage medium 280. A program that causes a computer to function as each section in this embodiment (i.e., a program that causes a computer to execute the process performed by each section) may be stored in the information storage medium 280.

The communication section 296 controls communication with the outside (e.g., terminal 10 or another server). The function of the communication section 296 may be implemented by hardware such as a processor or a communication ASIC, a program, or the like.

Note that the server 20 may receive a program (data) that causes a computer to function as each section in this embodiment from an information storage medium or a storage section included in another server via a network, and may store the received program (data) in the information storage medium 280 or the storage section 270. A case where the server 20 receives a program (data) that causes the server 20 to function as each section is included within the scope of the invention.

The processing section 200 (processor) performs a game process, an image generation process, a sound process, and the like based on the received data, a program, and the like.

The processing section 200 performs various processes using a main storage section 271 included in the storage section 270 as a work area. The function of the processing section 200 may be implemented by hardware such as a processor (e.g., CPU or DSP) or an ASIC (e.g., gate array), or a program.

The processing section 200 includes an object space setting section 210, an acquisition section 211, a reference point change section 212, an input direction determination section 213, a movement control section 214, a game processing section 215, a display control section 216, an image generation section 220, a communication control section 221, and a sound processing section 230. Note that the processing section 200 may have a configuration in which some of these sections are omitted.

The acquisition section 211 acquires captured image information, input information that has been input by the player, and input information (acceleration) from the input section from the terminal.

The input direction determination section 213 determines the input direction based on the reference point and the indication position. The reference point change section 212 determines whether or not to change the reference point based on the angle formed by a first direction that is determined by the reference point and an indication position at a first timing or a timing that precedes the first timing, and a second direction that is determined by the indication position at the first timing and an indication position at a second timing that follows the first timing, or the angle formed by connection lines that connect indication positions at different timings, and changes the reference point when the reference point change section 212 has determined to change the reference point.

The movement control section 214 performs a movement control process based on the input direction.

The reference point change section 212 may determine the new position of the reference point based on the previous indication position.

The display control section 216 may perform a display control process on the object, and the movement control section 214 may perform the movement control process on the display object based on the input direction.

The acquisition section 211 may function as a touch position information acquisition section that acquires information about the touch position on the display section as the indication position.

A reference point reset section 217 may reset the reference point based on predetermined input information.

The reference point reset section 217 may set an area that corresponds to a predetermined area of the display section as a reset area, may determine whether or not the reset area has been touched based on the information about the touch position on the display section, and may reset the reference point when the reference point reset section 117 has determined that the reset area has been touched.

An input mode change section 218 may change the current input mode based on predetermined input information, and the input direction determination section 213 may calculate the input direction from the reference point and the indication position as the input information when the current input mode is a first input mode.

The movement control section 214 may change the movement control target object based on the information about the touch position, and may perform the movement control process on the new movement control target object based on the input direction.

The object space setting section 211 disposes an object (e.g., character) in an object space (virtual three-dimensional space). For example, the object space setting section 211 performs a process similar to the process performed by the object space setting section 111 of the terminal 10.

The game processing section 215 performs a process similar to the process performed by the game processing section 115 of the terminal 10.

The game processing section 215 of the server 20 may perform a process that provides a browser game to the terminal 10. For example, when the server 20 has received a request for the address of a web page that provides a game service from the terminal 10, the game processing section 215 may transmit the game data of the web page to the terminal 10, and perform the game process based on the input information received from the terminal 10.

The image generation section 220 controls a virtual camera (viewpoint) for generating an image viewed from a given (arbitrary) viewpoint in the object space. For example, the image generation section 220 performs a process similar to the process performed by the image generation section 120 of the terminal 10.

The communication control section 221 may perform a process that exchanges data with the terminal 10 via a network.

Note that the server 20 may transmit network information necessary for the communication control process to the terminal 10. For example, the server 20 manages terminal identification information that is assigned to each terminal, and packet destination information that is linked to the terminal identification information.

The communication control section 221 of the server 20 performs a process that generates a packet that is transmitted to the terminal 10, a process that designates the IP address or the port number of the packet transmission destination terminal, a process that stores data included in the received packet in the storage section 270, a process that analyzes the received packet, a process that controls an additional packet transmission/reception process, and the like.

The communication control section 221 also performs a process that transmits and receives data in a predetermined cycle (e.g., every second) after the server 20 has connected to the terminal 10 until the server 20 disconnects from the terminal 10. The data transmitted from the terminal 10 may be the input information from the input section 160 of the terminal 10, or may be position information and movement information about an object (character or moving object) that is operated using each terminal 10.

The communication control section 221 also performs a process that analyzes a packet transmitted from the terminal 10, and stores data (e.g., position information about an object that is operated using the terminal 10) included in the received packet in the main storage section 271.

The communication control section 221 receives input information that has been input by the player.

The communication control section 121 may perform a process that receives the input information (acceleration) from the input section of the terminal 10 the from terminal 10.

The communication control section 221 transmits the game data to the terminal 10. The communication control section 221 may transmit various images (e.g., augmented reality image) that are displayed on the display section 190 of the terminal 10.

The image generation section 220 performs a drawing process based on the results of various processes performed by the processing section 200 to generate an image. The image generation section 220 performs a process similar to the process performed by the image generation section 120 of the terminal 10.

The invention may be applied to various game systems (e.g., consumer game system or arcade game system). The embodiments of the invention may be applied to various games (e.g., superiority/inferiority determination game, battle game, role-playing game, and action game). For example, the embodiments of the invention may be applied to a server that provides various games.

The invention is not limited to the above embodiments. Various modifications and variations may be made of the above embodiments. Any term cited with a different term having a broader meaning or the same meaning at least once in the specification and the drawings may be replaced by the different term in any place in the specification and the drawings.

The invention includes various other configurations substantially the same as the configurations described in connection with the above embodiments (e.g., a configuration having the same function, method, and results, or a configuration having the same objective and effects). The invention also includes a configuration in which an unsubstantial section (element) described in connection with the above embodiments is replaced with another section (element). The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments. The above embodiments (examples) can be arbitrarily combined.

The above embodiments have been described taking an example in which a joystick-like operation is implemented using a touch panel. Note that the invention is not limited thereto. The invention may be applied to the case where the input direction is determined based on the reference point and the touch position.

When performing the movement control process on the object using the input direction acquired by the above input determination method, the object within the display screen need not be touched. When the object that is subjected to the movement control process is selected, or the object that is subjected to the movement control process has been determined or is automatically selected, the movement of the object can be controlled using an input vector obtained by sliding the touch position at an arbitrary position within the screen (i.e., the object need not be touched).

Although only some exemplary embodiments and/or examples of the invention have been described in detail above, those skilled in the art will readily appreciate that many modifications are possible in the exemplary embodiments and/or examples without materially departing from the novel teachings and advantages of the invention. Accordingly, all such modifications are intended to be included within the scope of the invention.

What is claimed is:

1. An input direction determination system that determines an input direction based on an indication position, the input direction determination system comprising:
    a processor, the processor is configured to
        determine the input direction based on a reference point and the indication position; and
        determine whether or not to change the reference point used to determine the input direction based on a first angle, the first angle is defined between a first direction and a second direction, the first direction is determined by the reference point and an indication position at a first timing or a timing that precedes the first timing, and the second direction is determined by the indication position at the first timing and an indication position at a second timing that follows the first timing, and
        at the second timing that follows the first timing, change the reference point used to determine the input direction as the indication position is moved over time, to the indication position that was at the first timing, when the first angle satisfies a predetermined reference point change condition.

2. The input direction determination system as defined in claim 1, wherein the processor is further configured to:
    perform a movement control process based on the input direction.

3. The input direction determination system as defined in claim 2, wherein the processor is further configured to
    change a movement control target object based on information about a touch position, and perform the movement control process on a new movement control target object based on the input direction.

4. The input direction determination system as defined in claim 1,
    wherein a new position of the reference point is determined based on a previous indication position.

5. The input direction determination system as defined in claim 1, wherein the processor is further configured to:
    perform a display control process on an object,
    wherein the movement control process is performed on a display object based on the input direction.

6. The input direction determination system as defined in claim 1,
    the input direction determination system acquiring information about a touch position on a display section as the indication position.

7. The input direction determination system as defined in claim 1, wherein the processor is further configured to:
    reset the reference point based on predetermined input information.

8. The input direction determination system as defined in claim 7, wherein the processor is further configured to
    set an area that corresponds to a predetermined area of a display section as a reset area, determine whether or not the reset area has been touched based on information about a touch position on the display section, and reset the reference point when the determination is that the reset area has been touched.

9. The input direction determination system as defined in claim 1, wherein the processor is further configured to:
    change a current input mode based on predetermined input information,
    wherein the input direction is calculated from the reference point and the indication position as the input information when the current input mode is a first input mode.

10. The input direction determination system as defined in claim 1,
    wherein the first direction is determined based on a touch position at the first timing or touch positions at a plurality of timings that precede the first timing.

11. The input direction determination system as defined in claim 1,
    wherein the second direction is determined based on touch positions at three or more timings that precede the second timing.

12. The input direction determination system as defined in claim 1, wherein the input determination system is a mobile phone, a smartphone, a portable terminal, a game device, or a portable game device.

13. A server that functions as the input direction determination system as defined in claim 1, and determines the input direction based on an indication position on a terminal, the server comprising:
    a communication control section that receives information about the indication position from the terminal via a network.

14. A network system that includes a terminal and a server that are connected via a network, and functions as the input direction determination system as defined in claim 1, the network system comprising:
    an acquisition section that acquires information about an indication position on the terminal.

15. The input direction determination system as defined in claim 1, wherein the processor is further configured to:
    perform a display control process on a display object in virtual three-dimensional space,
    wherein the movement control process is performed on a display object based on the first angle as the input direction changes due to the indication position being moved over time.

16. The input direction determination system as defined in claim 1,
    wherein the processor is further configured to select the indication position to which the reference point is changed because the indication position is a touch position that was touched as the indication position at the first timing on a display section.

17. A non-transitory information storage medium storing a program that implements a process that determines an input direction based on an indication position, the program causing a computer to function as:

an input direction determination section that determines the input direction based on a reference point and the indication position; and a reference point change section that determines whether or not to change the reference point used to determine the input direction based on a first angle, the first angle is defined between a first direction and a second direction, the first direction is determined by the reference point and an indication position at a first timing or a timing that precedes the first timing, and the second direction is determined by the indication position at the first timing and an indication position at a second timing that follows the first timing, and at the second timing the follows the first timing, the reference point change section changes the reference point used to determine the input direction as the indication position is moved over time to the indication position at the first timing, to the indication position that was at the first timing, when the first angle satisfies a predetermined reference point change condition.

18. The non-transitory information storage medium as defined in claim 17, wherein the program further causes the computer to:

perform a display control process on a display object in virtual three-dimensional space, wherein the movement control process is performed on a display object based on the first angle as the input direction changes due to the indication position being moved over time.

* * * * *